United States Patent
Omori et al.

(10) Patent No.: US 11,533,186 B2
(45) Date of Patent: Dec. 20, 2022

(54) PROPRIETOR'S IDENTITY CONFIRMATION SYSTEM, TERMINAL MANAGEMENT SERVER, AND PROPRIETOR'S IDENTITY CONFIRMATION METHOD

(71) Applicant: Nippon Telegraph and Telephone Corporation, Tokyo (JP)

(72) Inventors: Yoshihiko Omori, Tokyo (JP); Takao Yamashita, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 159 days.

(21) Appl. No.: 16/964,889

(22) PCT Filed: Feb. 5, 2019

(86) PCT No.: PCT/JP2019/004110
§ 371 (c)(1),
(2) Date: Jul. 24, 2020

(87) PCT Pub. No.: WO2019/156089
PCT Pub. Date: Aug. 15, 2019

(65) Prior Publication Data
US 2021/0036871 A1    Feb. 4, 2021

(30) Foreign Application Priority Data
Feb. 9, 2018 (JP) .............................. JP2018-022518

(51) Int. Cl.
*H04L 29/06* (2006.01)
*H04L 9/32* (2006.01)
*G06F 21/33* (2013.01)

(52) U.S. Cl.
CPC ............ *H04L 9/3268* (2013.01); *G06F 21/33* (2013.01); *H04L 9/3247* (2013.01)

(58) Field of Classification Search
CPC . H04L 9/3268; H04L 9/3247; H04L 63/0823; G06F 21/33; G06F 21/45
See application file for complete search history.

(56) References Cited

U.S. PATENT DOCUMENTS 10,389,729 B2 * 8/2019 Troesch ................ H04L 63/108
10,460,098 B1 * 10/2019 Wang .................. H04L 63/0838
(Continued)

FOREIGN PATENT DOCUMENTS

WO    WO-2015136142 A1 *  9/2015  ........... G06F 21/445
WO    WO-2017018829 A1 *  2/2017  ............. G06F 21/31

OTHER PUBLICATIONS

Josang, Audun, and Simon Pope. "User centric identity management." AusCERT Asia Pacific information technology security conference. 2005. (Year: 2005).*
(Continued)

*Primary Examiner* — Joseph P Hirl
*Assistant Examiner* — Ka Shan Choy
(74) *Attorney, Agent, or Firm* — Fish & Richardson P.C.

(57) ABSTRACT

A terminal A transmits an owner identity confirmation start request to a terminal B including owner server association information capable of identifying an owner of the terminal and a terminal management server A of the terminal. The terminal B transmits an owner identity confirmation request to the terminal management server B of the terminal, the owner identity confirmation request including the owner server association information received and the owner server association information including information of the terminal B. The terminal management server B transmits, to the terminal management server A, an inter-server owner identity confirmation request including the identity confirmation information of the owner of the terminal B and the owner server association information of the terminal A. The terminal management server A compares the identity confir- (Continued)

mation information of the owner of the terminal A with the identity confirmation information received, and confirms the owner identity of the two terminals.

10 Claims, 23 Drawing Sheets

(56) References Cited

U.S. PATENT DOCUMENTS

| | | | | |
|---|---|---|---|---|
| 2003/0187990 | A1* | 10/2003 | Knauerhase | H04L 67/14 709/227 |
| 2015/0199699 | A1* | 7/2015 | Milton | G06F 16/9537 705/7.34 |
| 2018/0375665 | A1* | 12/2018 | Contenti | H04L 63/0442 |

OTHER PUBLICATIONS

[No Author Listed]. "FY 2015 METI Construction Project (Survey and research on the ideal form of public-private partnership utilizing the ID-linked trust framework)," Japan Infonnation Economy Society Promotion Association, Mar. 2016, 394 pages (with English Translation).

Ogata et al., "A Study on the Maintenance of Private Keys for Authentication Methods Using Asymmetric Keys Investigation of how to manage secret keys used for user authentication in webbased services," 2016 IEICE Communications Society Conference, Sep. 20, 2016, p. 99, 3 pages (with English Translation).

Omori et al., "Sharing and transfer of authority between terminals based on terminal owner verification in cooperation with ID provider," Institute of Electronics, Information and Communication Engineers, 2018, 117(459):403-408, 13 pages (with English Translation).

* cited by examiner

| 131 | 132 | 133 | 130 |
|---|---|---|---|
| OWNER IDENTIFIER | NAME | ADDRESS | |
| 38743028 | SUZUKI TARO | TAITO-KU, TOKYO··· | |
| ... | ... | ... | |

| 134 | 135 | |
|---|---|---|
| IDENTITY CONFIRMATION INFORMATION SOURCE | IDENTITY CONFIRMATION INFORMATION DATA | |
| DRIVER LICENCE | ######## | 139 |
| ... | ... | |

Fig. 3

| OWNER IDENTIFIER | TERMINAL IDENTIFIER | CERTIFICATE IDENTIFIER |
|---|---|---|
| 38743028 | 73642934 | 74638473 |
| ... | ... | ... |

| VALID PERIOD | STATE | CERTIFICATE DATA |
|---|---|---|
| 20180107122334-20200107122334 | VALID | ######## |
| ... | ... | ... |

Fig. 4

| 151 | 152 | |
|---|---|---|
| TERMINAL IDENTIFIER | CERTIFICATE IDENTIFIER | |
| 73642934 | 46378473 | |
| ... | ... | |

| | 153 | 154 | 155 | |
|---|---|---|---|---|
| | VALID PERIOD | STATE | CERTIFICATE DATA | |
| | 20180107142334-20180107143334 | VALID | ######## | 159 |
| | ... | ... | ... | |

Fig. 5

PROPRIETOR'S IDENTITY CONFIRMATION SYSTEM, TERMINAL MANAGEMENT SERVER, AND PROPRIETOR'S IDENTITY CONFIRMATION METHOD

CROSS-REFERENCE TO RELATED APPLICATIONS

This application is a National Stage application under 35 U.S.C. § 371 of International Application No. PCT/JP2019/004110, having an International Filing Date of Feb. 5, 2019, which claims priority to Japanese Application Serial No. 2018-022518, filed on Feb. 9, 2018. The disclosure of the prior application is considered part of the disclosure of this application, and is incorporated in its entirety into this application

TECHNICAL FIELD

The present invention relates to an owner identity confirmation system, a terminal management server, and an owner identity confirmation method that allow confirmation that owners of a plurality of terminals that access a service using a network are the same.

BACKGROUND ART

User authentication is required when accessing services over a network, and for example, user authentication using public key cryptography typified by Fast IDentity Online (FIDO) has been widely used. In user authentication of FIDO, a private key for public key cryptography (signature generation key, authentication key) is stored in a terminal used by a user, and (1) a server providing a service generates a random number and transmits it to the terminal, (2) the terminal generates a signature (digital signature) with respect to the random number by using the private key and transmits it to the server, and (3) the server verifies the signature to perform user authentication. For this reason, securing security of the private key is important, and thus export of the private key is prohibited, the use of the private key other than the original use such as the signature generation is prevented, and identity confirmation is performed when accessing the private key.

On the other hand, the variety of services and usage patterns increases cases that a single user utilizes a plurality of terminals. To access services as the same user from a plurality of terminals, it is necessary for each terminal to perform user authentication by using the same private key. A technique for making one private key to be available in a plurality of terminals is known, for example, as a technique of Non Patent Literature 1. A technique of Non Patent Literature 2 is also known as a technique for making a private key stored in an IC card to be available for a plurality of terminals.

FIG. 21 to FIG. 23 are diagrams illustrating a technique for copying a private key between terminals that have the same owner by verifying an owner certificate according to related art. FIG. 21 is a diagram illustrating a certificate issue server issuing an owner certificate to a terminal according to related art. In FIG. 21, a certificate issue server (terminal management server) issues, to each of a terminal A and a terminal B, an owner certificate indicating that the owner of the terminal is the owner X. The owner certificate includes identification information of the terminal, identification information of the owner of the terminal, and a public key corresponding to a private key of the terminal, and is provided with a signature of the certificate issue server.

FIG. 22 is a diagram illustrating a user registration process to a Web site according to related art. With reference to FIG. 22, the processing contents when the owner X of the terminal A performs user registration to a Web site that provides a service will be described. In step S911, the terminal A generates a key pair. In step S912, the public key generated by the terminal A is transmitted to the Web site to apply user registration. In step S913, the Web site associates the owner X being the user with the public key to register them in a public key database. The user registration is completed as described above.

Subsequently, at step S921, the Web site transmits a random number to the terminal A, the terminal A generates a signature by using the random number for the private key and transmits it to the Web site, the Web site performs user authentication by verifying the signature with the public key in the public key database, and then the terminal A can use services at the Web site.

FIG. 23 is a diagram illustrating a copy process of a private key between terminals owned by the same owner according to related art. With reference to FIG. 23, the process by which the owner X copies the private key from the terminal A to the terminal B will be described. In step S931, the owner included in the owner certificate is compared between the terminal A and the terminal B. In step S932, the private key is copied if they are the same owner. With the above, the service of the Web site is also available from the terminal B. That is, in step S941, in a similar manner to step S921, the terminal B performs user authentication to make the Web site services available.

CITATION LIST

Non Patent Literature

NPL 1: Ogata Yusuke, and other three persons, "Consideration about Maintenance of Private Key of Authentication Scheme Using Asymmetric Key", The Institute of Electronics, Information and Communication Engineers, Communication Society Meeting 2016, B-7-9, September, 2016

NPL 2: JIPDEC, "Ministry of Economy, Trade and Industry, Electronics Construction Project 2015 (Research and Study about the Way of Public-Private Cooperation Utilizing ID Cooperation Trust Framework) General Description Report", [online], [Searched on Jan. 19, 2018], Internet <URL:http://www.meti.go.j.p/meti_lib/report/2016fy/000674.pdf>

SUMMARY OF THE INVENTION

Technical Problem

In related art, there is only one certificate issue server (terminal management server) which is an issue source of an owner certificate, and the certificate issue source issues an owner certificate to all terminals. However, there are a plurality of issue sources depending on the type of terminals, manufacturers, or providers of applications, and issue sources are not assumed to be different, and a private key may not be copied.

Even if owner certificates of different issue sources are compared, owner description formats may be considered to be different depending on issue sources, such as an issue source unique owner identifier, name, name and address, or the like, and both do not match in general. By attempting to perform fraudulent copy a private key from a terminal of another person to own terminal, there is a possibility that the personal information described in an owner certificate of the terminal of the other person may leak and be specified.

The above problems are not limited to copying a private key. For example, there is a problem that occurs even in copy of personal information between a plurality of terminals, copy of digital copyright, Client To Authenticator Protocol (CTAP) communication between a terminal (client) and an Authenticator (a device storing a private key) in FIDO, communication between Internet of Things (IoT) terminals, or the like, and it is necessary to confirm that owners of terminals are the same.

In light of the foregoing, an object of the present invention is to provide an owner identity confirmation system, a terminal management server, and an owner identity confirmation method that allow confirmation that owners of a plurality of terminals are the same.

Means for Solving the Problem

To solve the above-described problem, an owner identity confirmation system according to claim 1 of the invention is an owner identity confirmation system in which a terminal and a terminal management server storing identity confirmation information of an owner of the terminal in a storage unit are connected through a communication network, the owner identity confirmation system confirming that two of the terminals are owned by a same owner. The terminal includes: an owner identity confirmation start request unit configured to transmit an owner identity confirmation start request to a confirmation target terminal indicating a terminal being a target of owner identity confirmation, the owner identity confirmation start request including owner server association information being information capable of identifying an owner of the terminal itself and a management source terminal management server indicating a terminal management server storing the identity confirmation information of the owner of the terminal itself; an owner identity confirmation request unit configured to, when receiving the owner identity confirmation start request, transmit an owner identity confirmation request to the management source terminal management server of the terminal itself, the owner identity confirmation request including owner identity confirmation start owner server association information indicating the owner server association information included in the owner identity confirmation start request and owner identity confirmation request owner server association information indicating the owner server association information of the owner of the terminal itself; and an owner identity confirmation response receiving unit configured to receive, from the management source terminal management server of the terminal itself, an owner identity confirmation response being a response to the owner identity confirmation request. The terminal management server includes: an inter-server owner identity confirmation request unit configured to, when receiving the owner identity confirmation request from the terminal, transmit an inter-server owner identity confirmation request including the owner identity confirmation start owner server association information included in the owner identity confirmation request, the owner identity confirmation request owner server association information included in the owner identity confirmation request, and the identity confirmation information of the owner that is identified by the owner identity confirmation request owner server association information and acquired from the storage unit, to a confirmation target terminal management server indicating the management source terminal management server of the terminal identified by the owner identity confirmation start owner server association information; an inter-server owner identity confirmation response unit configured to, when receiving the inter-server owner identity confirmation request, acquire from the storage unit the identity confirmation information of the owner identified by the owner identity confirmation start owner server association information included in the inter-server owner identity confirmation request, compare the acquired identity confirmation information with the identity confirmation information included in the inter-server owner identity confirmation request, determine whether or not these indicate the same owner, and transmit an inter-server owner identity confirmation response including a determination result to the terminal management server of a transmission source of the inter-server owner identity confirmation request; and an owner identity confirmation response unit configured to, when receiving the inter-server owner identity confirmation response, transmit the owner identity confirmation response regarded as the inter-server owner identity confirmation response to the terminal of a transmission source of the owner identity confirmation request.

A terminal management server according to claim 9 of the invention is a terminal management server connected to a terminal through a communication network, the terminal management server storing identity confirmation information of an owner of the terminal in a storage unit and confirming that two of the terminals are owned by a same owner, the terminal management server including: an inter-server owner identity confirmation request unit configured to, when receiving, from a terminal that has received an owner identity confirmation start request including owner server association information being information capable of identifying an owner of the terminal itself and a management source terminal management server indicating a terminal management server storing the identity confirmation information of the owner of the terminal itself, an owner identity confirmation request including owner identity confirmation start owner server association information indicating the owner server association information included in the owner identity confirmation start request and owner identity confirmation request owner server association information indicating the owner server association information of the owner of the terminal itself, transmit an inter-server owner identity confirmation request including the owner identity confirmation start owner server association information included in the owner identity confirmation request, the owner identity confirmation request owner server association information included in the owner identity confirmation request, and the identity confirmation information of the owner that is identified by the owner identity confirmation request owner server association information and acquired from the storage unit, to a confirmation target terminal management server indicating a management source terminal management server of the terminal identified by the owner identity confirmation start owner server association information; an inter-server owner identity confirmation response unit configured to, when receiving the inter-server owner identity confirmation request, acquire from the storage unit the identity confirmation information of the owner identified by the owner identity confirmation start owner server association information included in the inter-server owner identity confirmation request, compare the acquired identity confirmation information with the identity confirmation information included in the inter-server owner identity confirmation request, determine whether or not these indicate the same owner, and transmit an inter-server owner identity confirmation response including a determination result to the terminal management server of a transmission source of the inter-server owner identity confirmation request; and an owner identity confirmation response unit configured to, when receiving the inter-server owner identity confirmation response, transmit an owner identity confirmation response regarded as the inter-server owner identity confirmation response to the terminal of a transmission source of the owner identity confirmation request.

Furthermore, an owner identity confirmation method according to claim 10 of the invention is an owner identity confirmation method for an owner identity confirmation system in which a terminal and a terminal management server storing identity confirmation information of an owner of the terminal in a storage unit are connected through a communication network, the owner identity confirmation system confirming that two of the terminals are owned by a same owner, the owner identity confirmation method including: in the terminal, transmitting an owner identity confirmation start request to a confirmation target terminal indicating a terminal being a target of owner identity confirmation, the owner identity confirmation start request including owner server association information being information capable of identifying an owner of the terminal itself and a management source terminal management server indicating a terminal management server storing the identity confirmation information of the owner of the terminal itself; when receiving the owner identity confirmation start request, transmitting an owner identity confirmation request to the management source terminal management server of the terminal itself, the owner identity confirmation request including owner identity confirmation start owner server association information indicating the owner server association information included in the owner identity confirmation start request and owner identity confirmation request owner server association information indicating the owner server association information of the owner of the terminal itself; and receiving, from the management source terminal management server of the terminal itself, an owner identity confirmation response being a response to the owner identity confirmation request, and in the terminal management server, when receiving the owner identity confirmation request from the terminal, transmitting an inter-server owner identity confirmation request including the owner identity confirmation start owner server association information included in the owner identity confirmation request, the owner identity confirmation request owner server association information included in the owner identity confirmation request, and the identity confirmation information of the owner that is identified by the owner identity confirmation request owner server association information and acquired from the storage unit, to a confirmation target terminal management server indicating the management source terminal management server of the terminal identified by the owner identity confirmation start owner server association information; when receiving the inter-server owner identity confirmation request, acquiring from the storage unit the identity confirmation information of the owner identified by the owner identity confirmation start owner server association information included in the inter-server owner identity confirmation request, comparing the acquired identity confirmation information with the identity confirmation information included in the inter-server owner identity confirmation request, determining whether or not these indicate the same owner, and transmitting an inter-server owner identity confirmation response including a determination result to the terminal management server of a transmission source of the inter-server owner identity confirmation request; and when receiving the inter-server owner identity confirmation response, transmitting the owner identity confirmation response regarded as the inter-server owner identity confirmation response to the terminal of a transmission source of the owner identity confirmation request.

With such a configuration, even in a case that the terminal management servers of the two terminals are different, the management source terminal management server of each terminal can compare the identity confirmation information of the owner of the terminal to confirm that the owners of the two terminals are the same.

Because the identity confirmation information is exchanged only between the terminal management servers and is not provided to terminals, even if a fraudulent party transmits a fraudulent message to the terminal management server, the fraudulent party cannot acquire the identity confirmation information. For this reason, it is possible to prevent fraudulent leakage of the identity confirmation information.

The terminal management server transmits, to the confirmation target management source management server, the identity confirmation information of the owner of the terminal that has sent the owner identity confirmation request. As a result, it is possible to prevent identity confirmation information of an owner of a terminal not performing the owner identity confirmation from being transmitted, and it is possible to suppress fraudulent leakage of the identity confirmation information.

The terminal management server transmits the identity confirmation information to the management source terminal management server of the terminal that has sent the owner identity confirmation start request. As a result, the identity confirmation information is prevented from being transmitted to a management source terminal management server of a terminal that has not executed the owner identity confirmation. For this reason, it is possible to suppress fraudulent leakage of the identity confirmation information.

The owner identity confirmation system according to claim 2 of the invention is the owner identity confirmation system according to claim 1. The owner identity confirmation start request unit included in the terminal generates by the terminal itself, or acquires from the management source terminal management server of the terminal itself, a random number, and includes the random number as an owner identity confirmation start random number in the owner identity confirmation start request. The owner identity confirmation request unit included in the terminal includes, in the owner identity confirmation request, the owner identity confirmation start random number included in the owner identity confirmation start request received and the random number generated or acquired by the owner identity confirmation start request unit as an owner identity confirmation request random number. The inter-server owner identity confirmation request unit included in the terminal management server verifies the owner identity confirmation start random number and the owner identity confirmation request random number included in the owner identity confirmation request by using a predetermined random number verification method, and transmits the inter-server owner identity confirmation request to the confirmation target terminal management server after successful verification.

With such a configuration, the terminal management server transmits the identity confirmation information to the confirmation target terminal management server in a case that the random number of the owner identity confirmation request is successfully verified. For this reason, a replay attack that utilizes transmission data transmitted by the terminal can be detected.

The owner identity confirmation system according to claim 3 of the invention is the owner identity confirmation system according to claim 2, in which in verification of the owner identity confirmation start random number and the owner identity confirmation request random number, the inter-server owner identity confirmation request unit included in the terminal management server transmits to the confirmation target terminal management server the owner identity confirmation start random number and the owner identity confirmation request random number included in the owner identity confirmation request, and when receiving the owner identity confirmation start random number and the owner identity confirmation request random number as the confirmation target terminal management server, confirms that the owner identity confirmation start random number received is identical to the owner identity confirmation request random number transmitted by the terminal management server itself, and that the owner identity confirmation request random number received is identical to the owner identity confirmation start random number transmitted by the terminal management server itself.

With such a configuration, the terminal management server can detect replay attacks in messages exchanged between the terminal management servers.

The owner identity confirmation system according to claim 4 of the invention is the owner identity confirmation system according to claim 2, in which in verification of the owner identity confirmation start random number and the owner identity confirmation request random number, the inter-server owner identity confirmation request unit included in the terminal management server confirms, when receiving the owner identity confirmation request, that the owner identity confirmation start random number and the owner identity confirmation request random number included in the owner identity confirmation request do not match the owner identity confirmation start random number and the owner identity confirmation request random number included in another owner identity confirmation request received before receiving the owner identity confirmation request.

With such a configuration, the terminal management server can detect replay attacks using transmission data transmitted by the terminal at the time of receiving the owner identity confirmation request.

The owner identity confirmation system according to claim 5 of the invention is the owner identity confirmation system according to any one of claims 1 to 4. The owner identity confirmation start request unit included in the terminal includes, in the owner identity confirmation start request, an identity confirmation level indicating specificity of the identity confirmation information to be verified by the inter-server owner identity confirmation response unit included in the terminal management server. The owner identity confirmation request unit included in the terminal includes, in the owner identity confirmation request, the identity confirmation level included in the owner identity confirmation start request received. The inter-server owner identity confirmation request unit included in the terminal management server acquires, from the storage unit, the identity confirmation information having the specificity according to the identity confirmation level included in the owner identity confirmation request received, and includes the identity confirmation information in the inter-server owner identity confirmation request. The inter-server owner identity confirmation response unit included in the terminal management server acquires, from the storage unit, the identity confirmation information of the owner identified by the owner identity confirmation start owner server association information included in the inter-server owner identity confirmation request, the identity confirmation information of the owner being corresponding to the identity confirmation level included in the inter-server owner identity confirmation request, and compares the acquired identity confirmation information with the identity confirmation information included in the inter-server owner identity confirmation request.

With such a configuration, the terminal management server transmits, to the confirmation target terminal management server, the identity confirmation information having specificity corresponding to the identity confirmation level specified by the terminal. By specifying the identity confirmation level as necessary, it is possible to prevent transmission of unnecessary identity confirmation information.

The owner identity confirmation system according to claim 6 of the invention is the owner identity confirmation system according to any one of claims 1 to 5. The owner server association information is a public key certificate including a signature that is generated by the terminal and added to the owner identity confirmation start request, the owner identity confirmation request, and the inter-server owner identity confirmation request, and identification information associated with the identity confirmation information stored in the storage unit, a public key for verifying the signature, and identification information of the management source terminal management server of the terminal. The inter-server owner identity confirmation request unit included in the terminal management server transmits the inter-server owner identity confirmation request to the confirmation target terminal management server after successful verification of the signature that is generated by the terminal and added to the owner identity confirmation request.

With such a configuration, it is possible to identify a terminal based on digital signing technique, and even if there is an attack such as tampering with communication data or spoofing a transmission source, the terminal management server can detect this and prevent fraudulent owner identity confirmation. In this way, it is possible to prevent fraudulent transmission of the identity confirmation information.

The owner identity confirmation system according to claim 7 of the invention is the owner identity confirmation system according to claim 6. The terminal includes a one time certificate request unit configured to request and newly acquire the public key certificate from the management source terminal management server of the terminal itself when the owner identity confirmation start request unit transmits the owner identity confirmation start request. The inter-server owner identity confirmation request unit included in the terminal management server is configured to, when receiving the owner identity confirmation request, transmit the inter-server owner identity confirmation request to the confirmation target terminal management server after confirming that the public key certificate included in the owner identity confirmation start owner server association information and the owner identity confirmation request owner server association information included in the owner identity confirmation request does not match the public key certificate included in the owner identity confirmation start owner server association information and the owner identity confirmation request owner server association information included in another owner identity confirmation request received before reception of the owner identity confirmation request.

With Such a configuration, it is possible to prevent replay attacks using a public key certificate.

The owner identity confirmation system according to claim 8 of the invention is the owner identity confirmation system according to any one of claims 1 to 7. The inter-server owner identity confirmation response unit included in the terminal management server adds the signature of the terminal management server itself to the inter-server owner identity confirmation response. The owner identity confirmation response unit included in the terminal management server transmits the owner identity confirmation response after successful verification of the signature of the terminal management server added to the inter-server owner identity confirmation response.

With such a configuration, it is possible to identify a terminal management server based on digital signing technique, and even if there is an attack such as tampering with communication data transmitted by a confirmation target terminal management server or spoofing a transmission source, the terminal management server can detect this and prevent fraudulent owner identity confirmation.

Effects of the Invention

According to the present invention, it is possible to provide an owner identity confirmation system, a terminal management server, and an owner identity confirmation method that allow confirmation that owners of a plurality of terminals are the same.

BRIEF DESCRIPTION OF DRAWINGS

FIG. 3 is a diagram illustrating a data configuration of an identity confirmation information database according to the first embodiment.

FIG. 4 is a diagram illustrating a data configuration of an owner certificate database according to the first embodiment.

FIG. 5 is a diagram illustrating a data configuration of a one time certificate database according to the first embodiment.

DESCRIPTION OF EMBODIMENTS

Overview of Owner Identity Confirmation Process

Figure 1:
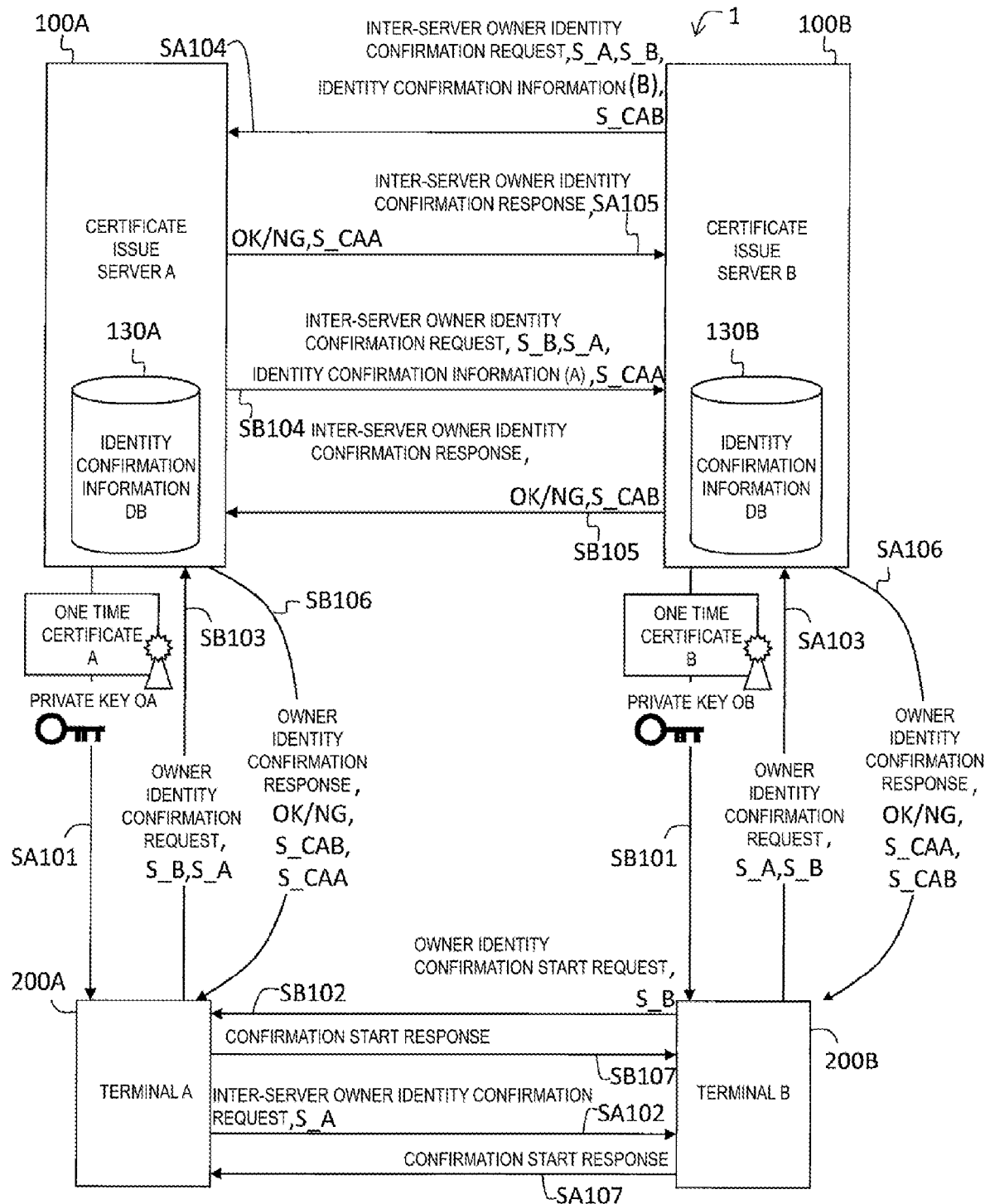
FIG. 1 is a diagram illustrating an overview of an owner identity confirmation process in an owner identity confirmation system according to a first embodiment.

An overview of an owner identity confirmation process in an owner identity confirmation system according to embodiments of the present invention will be described below. FIG. 1 is a diagram illustrating an overview of an owner identity confirmation process in an owner identity confirmation system 1 according to a first embodiment. After describing the process overview in FIG. 1, components of the owner identity confirmation system 1 will be described by using FIG. 2 to FIG. 7, and details of the owner identity confirmation process will be described by using FIG. 8 and FIG. 12.

The owner identity confirmation system 1 includes a certificate issue server A 100A, a certificate issue server B 100B, a terminal A 200A, and a terminal B 200B. Each of the certificate issue server A 100A and the certificate issue server B 100B includes an identity confirmation information database (an identity confirmation information database (DB)) 130A and an identity confirmation information database 130B.

In a case that the certificate issue server A 100A and the certificate issue server B 100B are not distinguished, the certificate issue server A 100A and the certificate issue server B 100B are described as a certificate issue server 100. In a case that the terminal A 200A and the terminal B 200B are not distinguished, the terminal A 200A and the terminal B 200B are described as a terminal 200. Furthermore, in a case that the identity confirmation information database 130A and the identity confirmation information database 130B are not distinguished, the identity confirmation information database 130A and the identity confirmation information database 130B are described as an identity confirmation information database 130. Note that the certificate issue server 100 stores information of an owner of the terminal 200, and thus is also referred to as a terminal management server.

The certificate issue server 100 issues an owner certificate and a one time certificate to the terminal 200. The owner certificate is a certificate indicating the owner of the terminal 200, including: an identifier (identification information) of the terminal 200; an identifier of the owner; a public key corresponding to a private key stored by the terminal 200; an identifier of the certificate issue server 100 as an issue source; an identifier of the certificate; the valid period of the certificate; and a digital signature of the certificate issue server 100 for the certificate.

When the owner applies the certificate issue server 100 to issue the owner certificate of the terminal 200, the owner sends identity confirmation information of the owner to the certificate issue server 100, and the certificate issue server 100 confirms that the applicant is the owner. The identity confirmation information is stored in the identity confirmation information database 130, which is described later. The certificate issue server 100 is also referred to as the (certificate) issue source of the terminal 200, the certificate issue source certificate issue server, the certificate issue server, and the management source terminal management server.

The one time certificate is a certificate that is temporarily issued during the owner identity confirmation process of the two terminals 200, including: an identifier of the terminal 200; a public key corresponding to a private key stored by the terminal 200; an identifier of the certificate issue server 100 as an issue source; an identifier of the certificate; the valid period of the certificate; and a digital signature of the certificate issue server 100 for the certificate. The one time certificate is issued by the certificate issue source of the terminal 200.

In a case that the owner identity confirmation process between the terminal A 200A and the terminal B 200B is performed, the terminal A 200A and the terminal B 200B exchange messages (requests and responses) with each certificate issue source. Messages are also exchanged between the two terminals. In addition, messages are also exchanged between certificate issue source certificate issue servers of the two terminals. The communication path that exchanges the messages is protected, for example, by Transport Layer Security (TLS), and authentication of a communication partner, securing confidentiality of the messages, and tampering detection of the messages are performed.

Note that the terminal of the owner identity confirmation target is also referred to as the owner identity confirmation target terminal, the confirmation target terminal, the target terminal, the owner identity confirmation partner terminal, or the partner terminal. When viewed from the certificate issue server 100, the owner identity confirmation target terminal with respect to the terminal 200 to which the certificate issue server 100 has issued the owner certificate is simply referred to as the target terminal of the certificate issue server 100, the owner identity confirmation target terminal, the owner identity confirmation partner terminal, or the partner terminal. For example, in FIG. 1, the terminal B 200B is the target terminal of the certificate issue server A 100A.

In step SA101, the terminal A 200A requests a one time certificate to the certificate issue server A 100A of the certificate issue source, and as a response, the certificate issue server A 100A transmits a one time certificate A and a private key OA to the terminal A 200A.

Step SB101 is a similar process in which the terminal A 200A is replaced with the terminal B 200B and the certificate issue server A 100A is replaced with the certificate issue server B 100B. SB102 to SB107 are also processes similar to SA102 to SA107 in which the terminal A 200A and the terminal B 200B are replaced and the certificate issue server A 100A and the certificate issue server B 100B are replaced, and thus SA102 to SA107 will be mainly described below.

In step SA102, the terminal A 200A transmits an owner identity confirmation start request to the terminal B 200B, which is the target terminal. The message is provided with a signature by the private key OA (denoted as S_A in FIG. 1) and the one time certificate A. For this one time certificate A, although not illustrated in FIG. 1, the message to which the signature S_A has been provided is provided with the one time certificate A including a public key used in the signature verification.

In step SA103, the terminal B 200B verifies S_A, provides S_B, which is a signature generated by using its own private key OB to the owner identity confirmation start request, and transmits it to the certificate issue server B 100B, which is its own certificate issue source, as the owner identity confirmation request.

In step SA104, the certificate issue server B 100B verifies S_A and S_B that has been provided to the owner identity confirmation request, and acquires the identity confirmation information of the owner of the terminal B 200B from the identity confirmation information database 130B. Next, the certificate issue server B 100B provides the received owner identity confirmation request with the acquired identity confirmation information (described in FIG. 1 as identity confirmation information (B)) and its own signature S_CAB, and transmits as an inter-server owner identity confirmation request to the certificate issue server A 100A.

In step SA105, the certificate issue server A 100A verifies the signatures S_A, S_B, S_CAB that are provided to the inter-server owner identity confirmation request. Next, the certificate issue server A 100A acquires the identity confirmation information of the owner of the terminal A 200A from the identity confirmation information database 130A, compares it with the identity confirmation information of the owner of the terminal B 200B included in the inter-server owner identity confirmation request, and transmits an inter-server owner identity confirmation response including the comparison result (confirmed or failed) and its own signature S_CAA to the certificate issue server B 100B.

In step SA106, the certificate issue server B 100B verifies the signature S_CAA, which is provided in the inter-server owner identity confirmation response, provides its own signature S_CAB to the inter-server owner identity confirmation response, and transmits it to the terminal B 200B as an owner identity confirmation response.

In step SA107, the terminal B 200B verifies the signatures S_CAB, S_CAA and transmits them to the terminal A 200A as an owner identity confirmation start response. By receiving the owner identity confirmation start response, the terminal A 200A can confirm that the owner of the terminal B 200B, which is the partner terminal, and the owner of the terminal A 200A are the same.

After confirming that the owners of the both terminals 200 are the same, a copy (exchange) of the authentication private key of the service provide site is started. Not only a copy of the private key, but after the owner identity confirmation, a copy of confidential information such as personal information or digital copyrights stored in the terminal 200 may be performed. A CTAP communication between a terminal (client) and an authentication device (Authenticator) in FIDO or a communication between IoT terminals may be performed.

Figure 2:
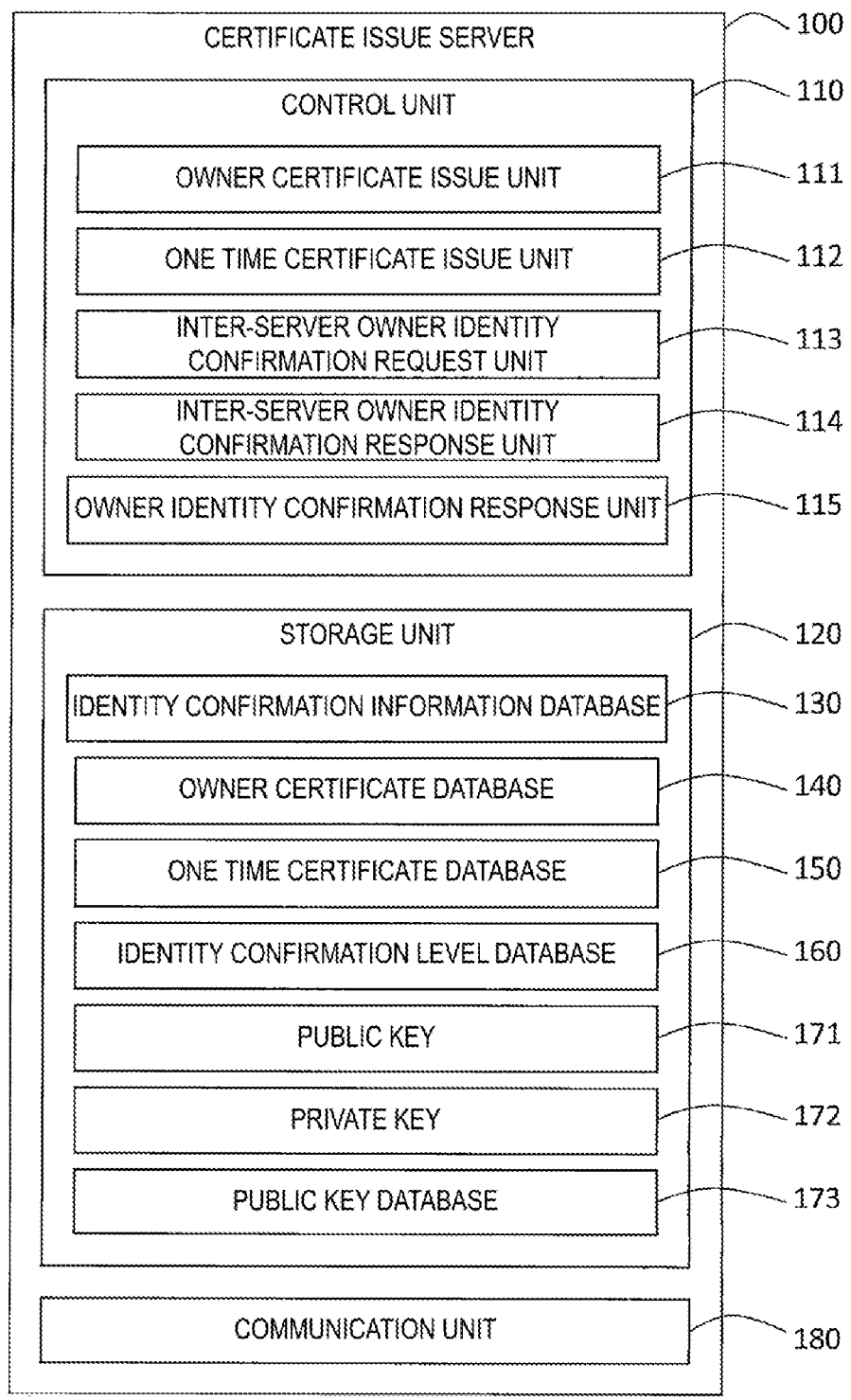
FIG. 2 is a diagram illustrating an overall configuration of a certificate issue server according to the first embodiment.

Overall Configuration of Certificate Issue Server according to First Embodiment FIG. 2 is a diagram illustrating an overall configuration of the certificate issue server 100 according to the first embodiment. The certificate issue server 100 includes a control unit 110, a storage unit 120, and a communication unit 180. The control unit 110 includes a Central Processing Unit (CPU) and functions the entire certificate issue server 100 by executing an Operating System (OS) in the storage unit 120 or an owner identity confirmation processing program (not illustrated) for the server. The storage unit 120 includes a Random Access Memory (RAM), Read Only Memory (ROM), Hard Disk Drive (HDD), flash memory, and the like, and stores various types of databases, and data in process, the owner identity confirmation processing program for the server, and the like. The communication unit 180 includes a Network Interface Card (NIC) and transmits and/or receives communication data to and/or from other certificate issue servers 100 or terminals 200.

The control unit 110 includes an owner certificate issue unit 111, a one time certificate issue unit 112, an inter-server owner identity confirmation request unit 113, an inter-server owner identity confirmation response unit 114, and an owner identity confirmation response unit 115. The storage unit 120 includes an identity confirmation information database 130, an owner certificate database 140, a one time certificate database 150, an identity confirmation level database 160, a public key 171, a private key 172, and a public key database 173.

The owner certificate issue unit 111 issues an owner certificate to the terminal 200 after performing identity confirmation of the owner of the terminal 200 in response to a request from the terminal 200. When performing identity confirmation, the owner certificate issue unit 111 acquires identity confirmation information such as a driver license or a health insurance card, confirms the owner identity, and stores the identity confirmation information in the identity confirmation information database 130 described later (see FIG. 3). The owner certificate issue unit 111 stores the issued owner certificate information in the owner certificate database 140 described later (see FIG. 4).

FIG. 3 is a diagram illustrating a data configuration of the identity confirmation information database 130 according to the first embodiment. The identity confirmation information database 130 is a database in a tabular format, for example, where one record (row) indicates identity confirmation information of one owner, and includes attributes (columns) such as an owner identifier 131, a name 132, an address 133, an identity confirmation information source 134, and identity confirmation information data 135.

The owner identifier 131 is identification information for uniquely identifying a record in the identity confirmation information database 130. The name 132 and the address 133 are the name and the address of the owner, respectively. The identity confirmation information source 134 is the source information of the identity confirmation information, and examples thereof include "driver license", and "health insurance card", "passport". The identity confirmation information data 135 is digitized source information and is, for example, an image of a driver license.

In addition to those illustrated in FIG. 3, the identity confirmation information database 130 includes attributes such as gender, date of birth, and place of employment. A record 139 indicates that the owner identifier 131 is "38743028", the name 132 is "Suzuki Taro", the address 133 is in "Taito-ku, Tokyo", and the information source represents that these information items are acquired from a "driver license".

FIG. 4 is a diagram illustrating a data configuration of the owner certificate database 140 according to the first embodiment. The owner certificate database 140 is a database in a tabular format, for example, where one record (row) indicates one owner certificate and includes attributes (columns) such as an owner identifier 141, a terminal identifier 142, a certificate identifier 143, a valid period 144, a state 145, and certificate data 146.

The owner identifier 141 is identification information of the owner included in the owner certificate and corresponds to the owner identifier 131 of the identity confirmation information database 130. The terminal identifier 142 is identification information of the terminal 200, which is the issue target of the owner certificate. The certificate identifier 143 is identification information for uniquely identifying the owner certificate and one time certificate issued by the certificate issue server 100. The valid period 144 is a valid period of the owner certificate. The state 145 is a state of the owner certificate, including states of "valid" or "expired". The certificate data 146 includes owner certificate data itself.

A record 149 is a record indicating the owner certificate whose certificate identifier 143 is "74638473," issued to the terminal 200 identified by the terminal identifier 142 being "73642934", where the owner identifier of the owner of the terminal 200 is "38743028", the valid period 144 is two years from 12:23:34 on Jan. 7, 2018, and is in a "valid" state.

Returning to FIG. 2, the one time certificate issue unit 112 generates a key pair of a private key and a public key in response to a request from the terminal 200, issues a one time certificate, and transmits the private key and the one time certificate to the terminal 200. The issued one time certificate information is stored in the one time certificate database 150 described later (see FIG. 5).

FIG. 5 is a diagram illustrating a data configuration of the one time certificate database 150 according to the first embodiment. The one time certificate database 150 is a database in a tabular format, for example, where one record (row) indicates a single one time certificate and includes attributes (columns) such as a terminal identifier 151, a certificate identifier 152, a valid period 153, a state 154, and certificate data 155.

The terminal identifier 151 is identification information of the terminal 200 which is the issue target of the one time certificate. The certificate identifier 152 is identification information for uniquely identifying the owner certificate and one time certificate issued by the certificate issue server 100. The valid period 153 is a valid period of the one time certificate. The certificate data 155 includes one time certificate data itself.

The state 154 is a state of the one time certificate, including states of "valid", "terminal used", "server used", and "expired". "Valid" indicates a state immediately after issuing the one time certificate. "Terminal used" indicates that it has been used for signature verification of the owner identity confirmation request received from the terminal 200. "Server used" indicates that it has been used for signature verification of the inter-server owner identity confirmation request received from another certificate issue server 100. The one time certificate issued by oneself is referred to one time for signature verification of the owner identity confirmation request and one time for signature verification of the inter-server owner identity confirmation request. The state 154 changes from "valid" to "terminal used", to "server used", to "expired", or changes from "valid" to "server used", to "terminal used", to "expired".

A record 159 is a record indicating the one time certificate whose certificate identifier 152 is "46378473," issued to the terminal 200 identified by the terminal identifier 151 being "73642934", where the valid period 153 is 10 minutes from 14:23:34 on Jan. 7, 2018, and is in a "valid" state.

Returning to FIG. 2, the inter-server owner identity confirmation request unit 113 receives the owner identity confirmation request (see steps SA103 and SB103 in FIG. 1) from the terminal 200 and transmits the inter-server owner identity confirmation request (see steps SA104 and SB104 in FIG. 1) to the certificate issue source of the target terminal. The inter-server owner identity confirmation request includes identity confirmation information and its own signature of the owner of the terminal 200 acquired from the identity confirmation information database 130 in accordance with the identity confirmation level included in the owner identity confirmation request with reference to the identity confirmation level database 160 described below.

Figure 6:
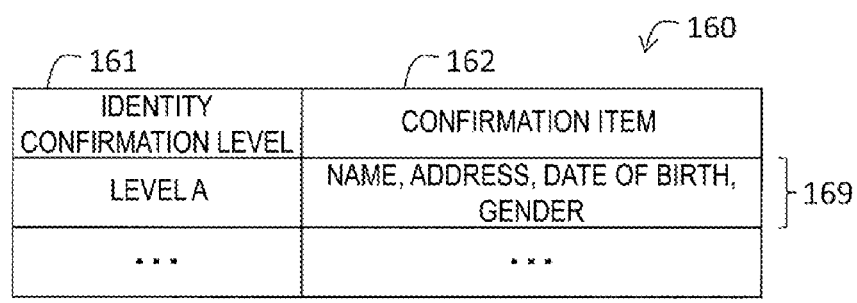
FIG. 6 is a diagram illustrating a data configuration of an identity confirmation level database according to the first embodiment.

FIG. 6 is a diagram illustrating a data configuration of the identity confirmation level database 160 according to the first embodiment. The identity confirmation level database 160 is a database in a tabular format, for example, where one record (row) indicates an association between one identity confirmation level and confirmation items, and includes attributes (columns) such as an identity confirmation level 161 and a confirmation item 162.

The identity confirmation level 161 indicates the confirmation level of the owner identity confirmation, and the confirmation item 162 indicates items of the identity confirmation information to be checked to confirm the owner identity of the identity confirmation level 161. A record 169 indicates to check the name, address, date of birth, and gender to confirm the owner identity in a case that the identity confirmation level is "level A". In addition, there may be a level that allows checking only the e-mail address to confirm the owner identity, and the types and number of items of the identity confirmation information (specificity of the identity confirmation information) vary depending on the identity confirmation level.

Returning to FIG. 2, the inter-server owner identity confirmation response unit 114 receives the inter-server owner identity confirmation request from the certificate issue source of the target terminal, and compares the identity confirmation information of the owner of the target terminal included in the inter-server owner identity confirmation request with the identity confirmation information of the owner of the terminal that is the issue target of the one time certificate acquired from the identity confirmation information database 130 of the server itself. Then, the inter-server owner identity confirmation response unit 114 transmits the inter-server owner identity confirmation response (see steps SA105 and SB105 in FIG. 1) including the comparison result (confirmed or failed) and its own signature to the certificate issue source of the target terminal.

The owner identity confirmation response unit 115 receives the inter-server owner identity confirmation response, provides its own signature, and transmits it as the owner identity confirmation response (see steps SA106 and SB106 in FIG. 1) to the terminal 200.

The public key 171 is a public key used for verification of the signature provided to the owner certificate or one time certificate issued by the certificate issue server 100. The private key 172 is a private key of public key cryptography paired with the public key 171, which is used for generation of the signature provided to the owner certificate or one time certificate, generation of the signature provided to a message, decoding or providing signature necessary to protect the communication path, and the like.

The public key database 173 is a database that includes public keys of other certificate issue servers 100 and is used for verification of the signature provided to a message, encryption or signature verification necessary to protect the communication path.

Overall Configuration of Terminal according to First Embodiment

Figure 7:
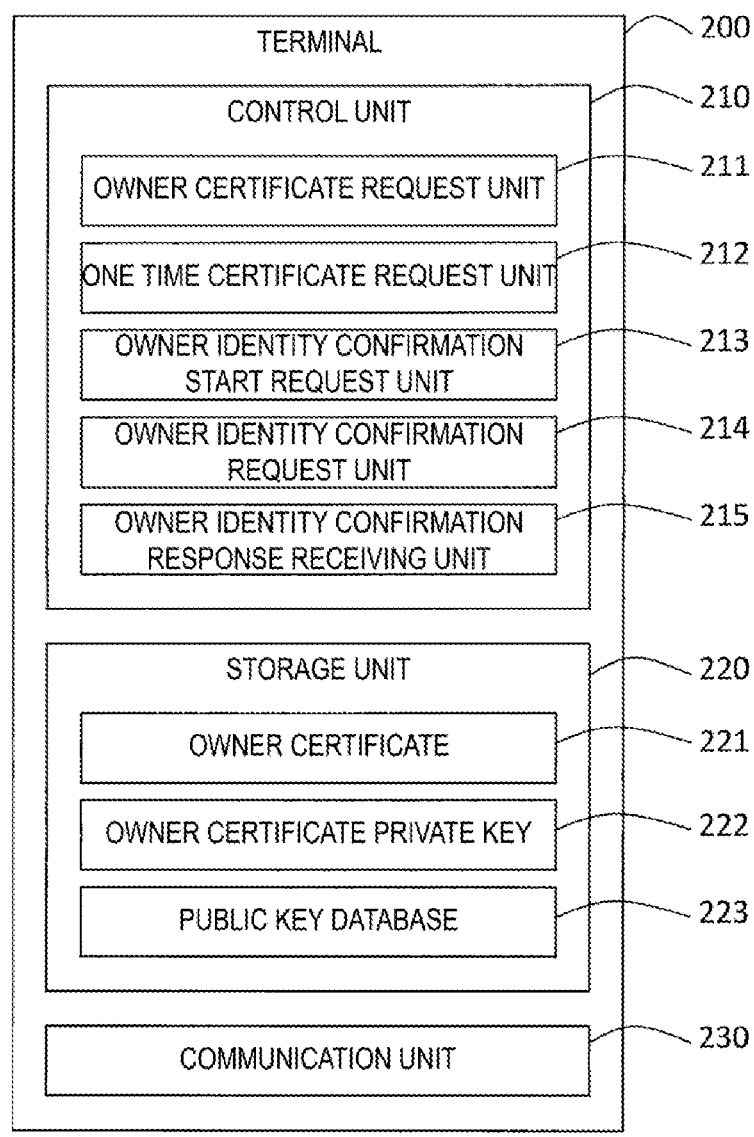
FIG. 7 is a diagram illustrating an overall configuration of a terminal according to the first embodiment.

FIG. 7 is a diagram illustrating an overall configuration of the terminal 200 according to the first embodiment. The terminal 200 includes a control unit 210, a storage unit 220, and a communication unit 230. The control unit 210 includes a CPU, and functions the entire terminal 200 by executing an OS in the storage unit 220 or the owner identity confirmation processing program (not illustrated) for the terminal. The storage unit 220 includes a RAM, ROM, HDD, flash memory, and the like, and stores the owner identity confirmation processing program for the terminal, data in process, and the like. The communication unit 230 includes a NIC and transmits and/or receives communication data with the certificate issue server 100 or other terminals 200.

The control unit 210 includes an owner certificate request unit 211, a one time certificate request unit 212, an owner identity confirmation start request unit 213, an owner identity confirmation request unit 214, and an owner identity confirmation response receiving unit 215. The storage unit 220 includes an owner certificate 221, an owner certificate private key 222, and a public key database 223. The public key database 223 is a database that includes a public key of the certificate issue server 100 that includes the certificate issue source, and includes a public key used for signature verification of a one time certificate or verification of a signature provided to a message.

The owner certificate request unit 211 requests the certificate issue server 100 to issue its own owner certificate and acquires it. The acquired owner certificate is stored in the owner certificate 221 of the storage unit 220. A private key corresponding to a public key included in the owner certificate 221 is stored in the owner certificate private key 222.

The one time certificate request unit 212 requests the certificate issue server 100 to issue its own one time certificate and acquires it with a private key. The request of issuing is provided with a signature generated by using the owner certificate private key 222 and the owner certificate 221. The certificate issue server 100 verifies the provided owner certificate 221 with its own public key, acquires the public key of the terminal 200 included in the owner certificate 221, verifies the signature provided to the request of issuing and generated with the owner certificate private key 222 by using the public key, and confirms (authenticates) that the request source of issuing is the terminal 200.

The response (see steps SA101 and SB101 in FIG. 1) of the certificate issue server 100 to the issue request of the one time certificate includes, in addition to the one time certificate, the private key corresponding to the public key included in the one time certificate (also called a one time private key hereinafter). This one time certificate is only valid during the execution of the owner identity confirmation process, and becomes expired when the owner identity confirmation process between the certificate issue servers 100 ends. The terminal 200 stores the one time certificate and the one time private key in the storage unit 220 during the owner identity confirmation process, but deletes when the process ends.

The owner identity confirmation start request unit 213 transmits the owner identity confirmation start request (see steps SA102 and SB102 in FIG. 1) to the target terminal. The owner identity confirmation start request message includes an identity confirmation level, and the signature generated by using the one time private key and the one time certificate is provided and transmitted to the (identity confirmation) target terminal.

The owner identity confirmation request unit 214 receives the owner identity confirmation start request from the target terminal, provides the signature generated with its own one time private key and its own one time certificate, and transmits it as the owner identity confirmation request (see steps SA103 and SB103 in FIG. 1) to the certificate issue source.

The owner identity confirmation response receiving unit 215 receives the owner identity confirmation response (see steps SA106 and SB106 in FIG. 1) received from the certificate issue source and transmits it to the partner terminal (see steps SA107 and SB107 in FIG. 1).

Owner Identity Confirmation Process according to First Embodiment

FIG. 8 to FIG. 12 are sequence diagrams of the owner identity confirmation process performed by the owner identity confirmation system according to the first embodiment. With reference to FIG. 8 to FIG. 12, the owner identity confirmation process will be described in detail. Note that prior to the owner identity confirmation process, the terminal 200 has acquired the owner certificate from the certificate issue source. It is also assumed that the security of each communication path between the terminal 200 and the certificate issue server 100 as the certificate issue source, between the two terminals 200, and between the two certificate issue servers 100. Note that verification and confirmation such as verification of a signature and confirmation of a valid period are performed in the owner identity confirmation process, but if the verification or confirmation fails, the owner identity confirmation process is stopped.

Figure 8:
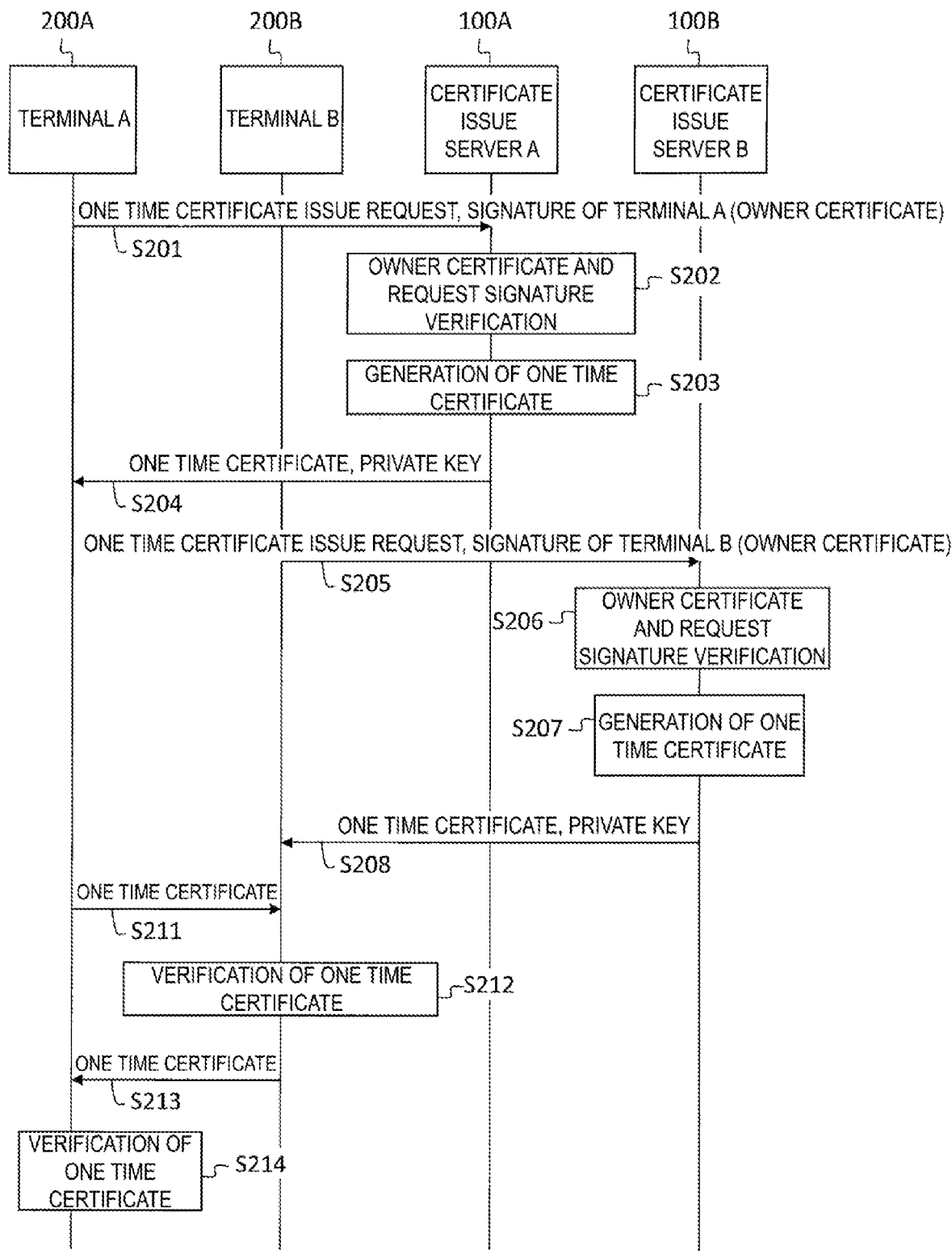
FIG. 8 is a sequence diagram (1) of the owner identity confirmation process performed by the owner identity confirmation system according to the first embodiment.

Owner Identity Confirmation Process: Process from Issuing One Time Certificate until Exchange (FIG. 8)

In step S201, the one time certificate request unit 212 of the terminal A 200A transmits a one time certificate issue request to the certificate issue server A 100A. The request is provided with a signature using the owner certificate private key 222 and the owner certificate 221.

In step S202, the one time certificate issue unit 112 of the certificate issue server A 100A performs verification of the owner certificate provided to the one time certificate issue request and the signature provided to the request. Specifically, the one time certificate issue unit 112 verifies the signature of the owner certificate by using its own public key 171, and verifies that the valid period has not passed. Next, the one time certificate issue unit 112 searches the record of the owner certificate database 140 (see FIG. 4) which has the same certificate identifier 143 as the certificate identifier included in the owner certificate, to confirm the state 145 being "valid".

Then, the one time certificate issue unit 112 verifies the signature provided to the one time certificate issue request by using the public key included in the verified owner certificate. If any verification (confirmation) fails, the terminal A 200A is notified and the owner identity confirmation process is stopped.

In step S203, the one time certificate issue unit 112 issues a one time certificate. Specifically, the one time certificate issue unit 112 generates a key pair of public key cryptography and generates a new certificate identifier. Then, the one time certificate issue unit 112 provides a signature using the private key 172 to the data including the identifier of the terminal A 200A, the generated certificate identifier, the generated public key, the identification information of the certificate issue server A 100A as the issue source, and the valid period of the certificate to issue a one time certificate. The valid period may be during the owner identity confirmation process and is, for example, 10 minutes from the current time.

The one time certificate issue unit 112 adds a record to the one time certificate database 150 (see FIG. 5) and stores data including the terminal identifier, the certificate identifier, the valid period, and the certificate itself included in the issued one time certificate into the terminal identifier 151, the certificate identifier 152, the valid period 153, and the certificate data 155, respectively. The one time certificate issue unit 112 sets the state 154 to "valid".

In step S204, the one time certificate issue unit 112 transmits the issued one time certificate and the generated private key (also referred to as a one time private key) to the terminal A 200A.

Steps S205 to S208 are similar processes to steps S201 to S204, in which the terminal A 200A is replaced with the terminal B 200B and the certificate issue server A 100A is replaced with the certificate issue server B 100B.

In step S211, the owner identity confirmation start request unit 213 of the terminal A 200A transmits the one time certificate to the terminal B 200B, which is the owner identity confirmation target terminal (target terminal).

In step S212, the owner identity confirmation start request unit 213 of the terminal B 200B verifies the received one time certificate, and acquires the public key included in the one time certificate. The verification uses the public key of the certificate issue server A 100A included in the public key database 223. If the verification fails, the owner identity confirmation process is stopped.

Steps S213 to S214 are similar processes to S211 to S212.

Owner Identity Confirmation Process: Owner Identity Confirmation Start Request to Owner Identity Confirmation Request (FIG. 9)

Figure 9:
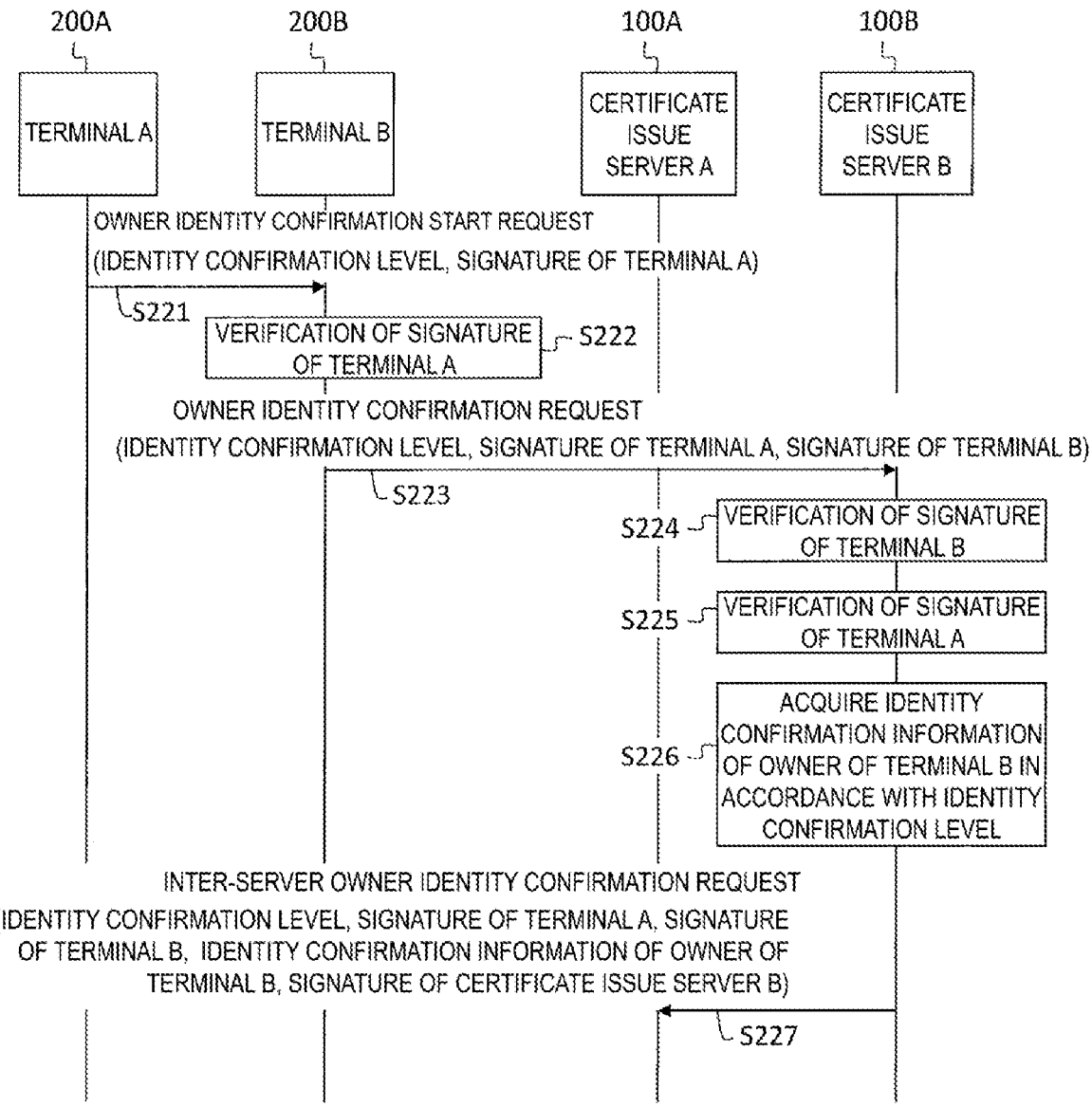
FIG. 9 is a sequence diagram (2) of the owner identity confirmation process performed by the owner identity confirmation system according to the first embodiment.

Turning to FIG. 9, in step S221, the owner identity confirmation start request unit 213 of the terminal A 200A transmits an owner identity confirmation start request to the terminal B 200B. The request is provided with an identity confirmation level, a signature (described as the signature of the terminal A in FIG. 9) using the private key (the one time private key) acquired in step S204, and a one time certificate.

Note that in the following messages, in a case that the signature using the one time private key is included, this is described as the signature of the terminal A. The message including the signature of the terminal A is provided with the one time certificate acquired in step S204 and including the public key used for the signature verification. The one time certificate is also provided to the owner identity confirmation start request of step S221, but the illustration is omitted. This is the same for the terminal B.

The recipient of the signatures of the terminal A and the one time certificate can perform not only verification of the signature, but also identification of the terminal A by referring to the one time certificate, identification of the owner identifier by referring to the owner certificate database 140 (see FIG. 4), and identification of the certificate issue source certificate server (management source terminal management server) of the terminal A. Thus, information that associates the signature of the terminal 200 and the one time certificate is also referred to as the owner server association information.

Note that if verification (confirmation) of the one time certificate or the signature provided to the message fails, the owner identity confirmation process is stopped. This is the same in other steps.

In step S222, the owner identity confirmation request unit 214 of the terminal B 200B verifies the signature of the terminal A provided to the owner identity confirmation start request. In step S223, the owner identity confirmation request unit 214 of the terminal B 200B provides the signature (the signature of the terminal B) using the one time private key to the received owner identity confirmation start request, and transmits it to the certificate issue server B 100B as the owner identity confirmation request. The owner identity confirmation request is provided with the one time certificate acquired in step S208 and the one time certificate of the terminal A received in step S221 (not illustrated in FIG. 9). The owner identity confirmation request includes an identity confirmation level, and the signature of the terminal A and the signature of the terminal B are provided to the identity confirmation level.

Thus, the owner identity confirmation request is provided with the owner server association information of the terminal A 200A, which has transmitted the owner identity confirmation start request (also referred to as the owner identity confirmation start owner server association information), and the owner server association information of the terminal B 200B, which has transmitted the owner identity confirmation request (also referred to as the owner identity confirmation request owner server association information).

In step S224, the inter-server owner identity confirmation request unit 113 of the certificate issue server B 100B verifies the signature of the terminal B provided to the owner identity confirmation request. Specifically, the inter-server owner identity confirmation request unit 113 verifies that the signature of the one time certificate of the terminal B provided to the owner identity confirmation request with its own public key, and confirms that the current date and time is within the valid period included in the one time certificate. Next, the inter-server owner identity confirmation request unit 113 searches for the record of the one time certificate database 150 (see FIG. 5) which has the same certificate identifier 152 as the certificate identifier included in the one time certificate.

Subsequently, the inter-server owner identity confirmation request unit 113 confirms that the state 154 of the record of the search result is "valid" or "server used", acquires a public key from the one time certificate, and verifies the signature of the terminal B provided to the owner identity confirmation request by using the public key. After verifying the signature of the terminal B, the state 154 of the record of the one time certificate is updated from "valid" to "terminal used", or "server used" to "invalid".

In step S225, the inter-server owner identity confirmation request unit 113 verifies the signature of the terminal A provided to the owner identity confirmation request. For verification, the signature of the one time certificate of the terminal A provided to the owner identity confirmation request is verified with the public key of the certificate issue server A 100A acquired from the public key database 173 to confirm the valid period, and then the public key is acquired to verify the signature of the terminal A by using this public key.

In step S226, the inter-server owner identity confirmation request unit 113 acquires, from the identity confirmation information database 130 (see FIG. 3), the identity confirmation information of the owner of the terminal B, in accordance with the identity confirmation level included in the owner identity confirmation request. Specifically, the inter-server owner identity confirmation request unit 113 references the identity confirmation level database 160 (see FIG. 6) with respect to the identity confirmation level included in the owner identity confirmation request, and acquires the confirmation item 162 corresponding to the identity confirmation level 161.

Next, the inter-server owner identity confirmation request unit 113 acquires the terminal identifier from the one time certificate of the terminal B (the one time certificate corresponding to the second signature included in the owner identity confirmation request), and searches for the record of the owner certificate database 140 (see FIG. 4) which has the same terminal identifier 142 as this to acquire the owner identifier 141.

Subsequently, the inter-server owner identity confirmation request unit 113 searches for the record of the identity confirmation information database 130 (see FIG. 3) which has the same owner identifier 131 as the acquired owner identifier 141, and acquires, from the record of the search result, each of the identity confirmation information items corresponding to the confirmation item 162 (hereinafter, these items are also described as the identity confirmation information).

Note that in a case that the identity confirmation information corresponding to the identity confirmation level cannot be acquired from the identity confirmation information database 130, the inter-server owner identity confirmation request unit 113 stops the owner identity confirmation process.

In step S227, the inter-server owner identity confirmation request unit 113 provides, to the owner identity confirmation request received in step S223, the acquired identity confirmation information (described as the identity confirmation information of the owner of the terminal B in FIG. 9) and the signature generated by using the private key 172 (described as the signature of the certificate issue server B in FIG. 9), and transmits it as the inter-server owner identity confirmation request to the certificate issue server A 100A. Note that the certificate issue server A 100A, which is the transmission target, is a certificate issue source of the terminal A 200A verified in step S225 (the terminal that has transmitted the owner identity confirmation start request), is a certificate issue server identified as the issue source of the one time certificate of the terminal A, and is also referred to as a confirmation target certificate issue server or a confirmation target terminal management server.

Owner Identity Confirmation Process: After Inter-Server Owner Identity Confirmation (FIG. 10)

Figure 10:
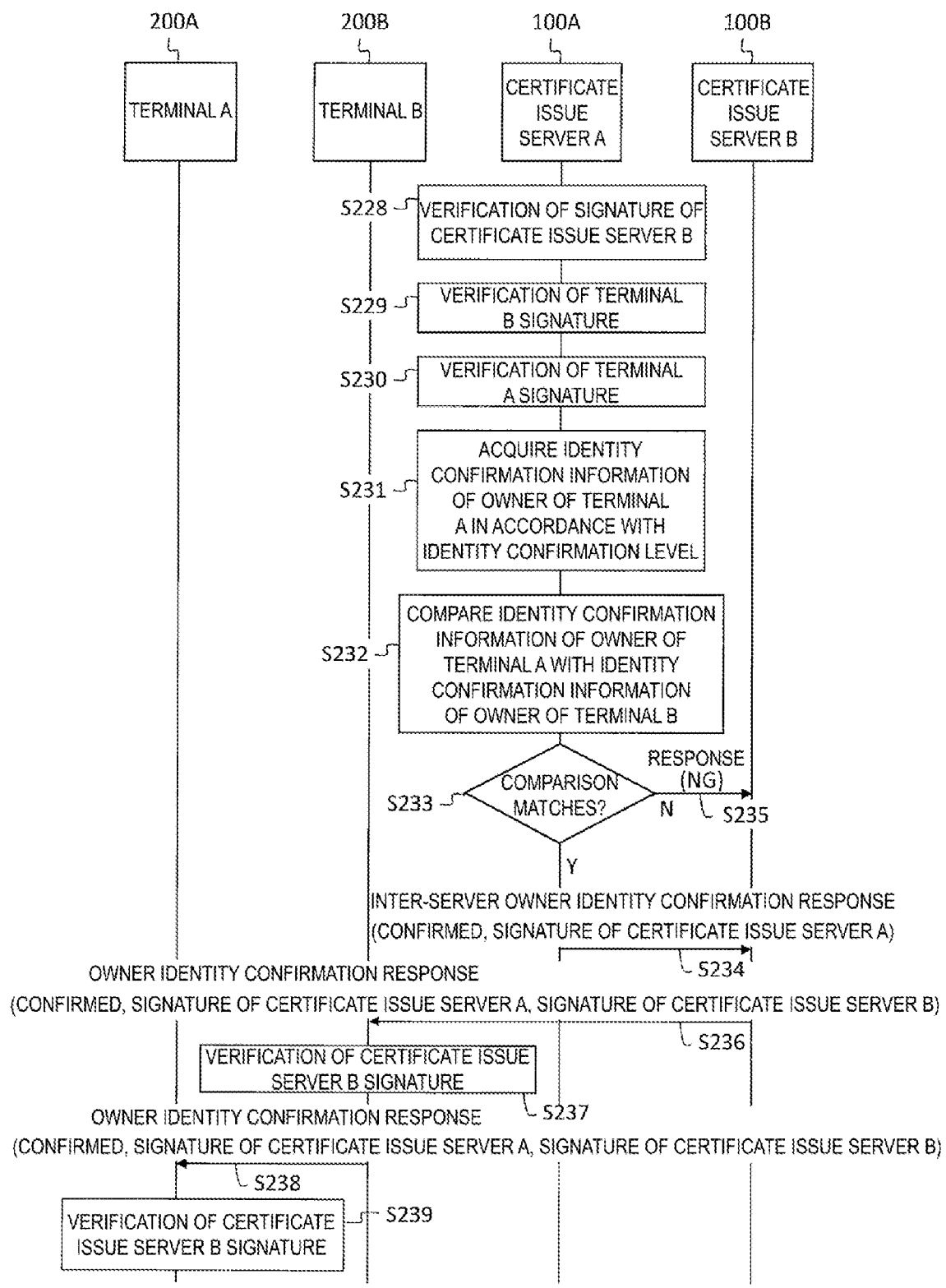
FIG. 10 is a sequence diagram (3) of the owner identity confirmation process performed by the owner identity confirmation system according to the first embodiment.

Turning to FIG. 10, at step S228, the inter-server owner identity confirmation response unit 114 of the certificate issue server A 100A verifies the signature of the certificate issue server B 100B, provided to the inter-server owner identity confirmation request. The verification uses the public key of the certificate issue server B 100B included in the public key database 173.

In step S229, the inter-server owner identity confirmation response unit 114 verifies the signature of the terminal B provided to the inter-server owner identity confirmation request. For verification, the signature of the one time certificate of the terminal B provided to the inter-server owner identity confirmation request is verified with the public key of the certificate issue server B 100B included in the public key database 173 to confirm the valid period, and then the public key of the terminal B is acquired to verify the signature of the terminal B by using this public key.

In step S230, the inter-server owner identity confirmation response unit 114 verifies the signature of the terminal A provided to the inter-server owner identity confirmation request. Specifically, the inter-server owner identity confirmation response unit 114 verifies that the signature of the one time certificate of the terminal A provided to the inter-server owner identity confirmation request with its own public key, and confirms that the current date and time is within the valid period. The, the inter-server owner identity confirmation response unit 114 searches for the record of the one time certificate database 150 which has the same certificate identifier 152 as the certificate identifier included in the one time certificate.

Subsequently, the inter-server owner identity confirmation response unit 114 confirms that the state 154 of the record of the search result is "valid" or "terminal used", acquires a public key from the one time certificate, and verifies the signature of the terminal A by using the public key. After verifying the signature of the terminal A, the state 154 of the record of the one time certificate is updated from "valid" to "server used", or "terminal used" to "invalid".

In step S231, the inter-server owner identity confirmation response unit 114 acquires, from the identity confirmation information database 130 (see FIG. 3), the identity confirmation information of the owner of the terminal A, in accordance with the identity confirmation level included in the inter-server owner identity confirmation request. The acquisition is of the identity confirmation information of the owner of the terminal that is the issue target of the one time certificate corresponding to the first signature included in the inter-server owner identity confirmation request, and the procedure is similar to step S226.

In step S232, the inter-server owner identity confirmation response unit 114 compares, for each item, the identity confirmation information of the terminal A acquired in step S231 (items of the identity confirmation information) and the identity confirmation information of the terminal B included in the inter-server owner identity confirmation request (items of the identity confirmation information).

In step S233, in a case that the items match in the comparison (step S233 to Y), the inter-server owner identity confirmation response unit 114 proceeds to step S234, and in a case that the items do not match in the comparison (step S233 to N), it proceeds to step S235. In step S234, the inter-server owner identity confirmation response unit 114 provides "confirmed" and the signature generated by using its own private key 172 (described in FIG. 10 as the signature of the certificate issue server A) and transmits it to the certificate issue server B 100B as an inter-server owner identity confirmation response.

In step S235, the inter-server owner identity confirmation response unit 114 provides "failed" and the signature generated by using its own private key 172 and transmits it to the certificate issue server B 100B as an inter-server owner identity confirmation response (in FIG. 10, described as a response (failed)).

The description is continued below as the comparison matches.

In step S236, the owner identity confirmation response unit 115 of the certificate issue server B 100B verifies the signature of the certificate issue server A 100A provided to the inter-server owner identity confirmation response, provides the signature generated by using its own private key 172 (described in FIG. 10 as the signature of the certificate issue server B) to the inter-server owner identity confirmation response, and transmits it to the terminal B 200B as the owner identity confirmation response.

In step S237, the owner identity confirmation response receiving unit 215 of the terminal B 200B verifies the signature of the certificate issue server B 100B provided to the owner identity confirmation response. The verification uses the public key of the certificate issue server B 100B in the public key database 223.

According to this verification, the terminal B 200B can confirm that the owner of the terminal A 200A, which is the owner identity confirmation target terminal, and the owner of the terminal B 200B are the same.

In step S238, the owner identity confirmation response receiving unit 215 transmits the owner identity confirmation response to the terminal A 200A.

In step S239, the owner identity confirmation response receiving unit 215 of the terminal A 200A verifies the signature of the certificate issue server A 100A provided to the owner identity confirmation response. The verification uses the public key of the certificate issue server A 100A in the public key database 223.

According to this verification, the terminal A 200A can confirm that the owner of the terminal B 200B, which is the owner identity confirmation target terminal, and the owner of the terminal A 200A are the same.

Owner Identity Confirmation Process: Process Symmetric with FIG. 9 to FIG. 10 (FIG. 11 to FIG. 12)

Figure 11:
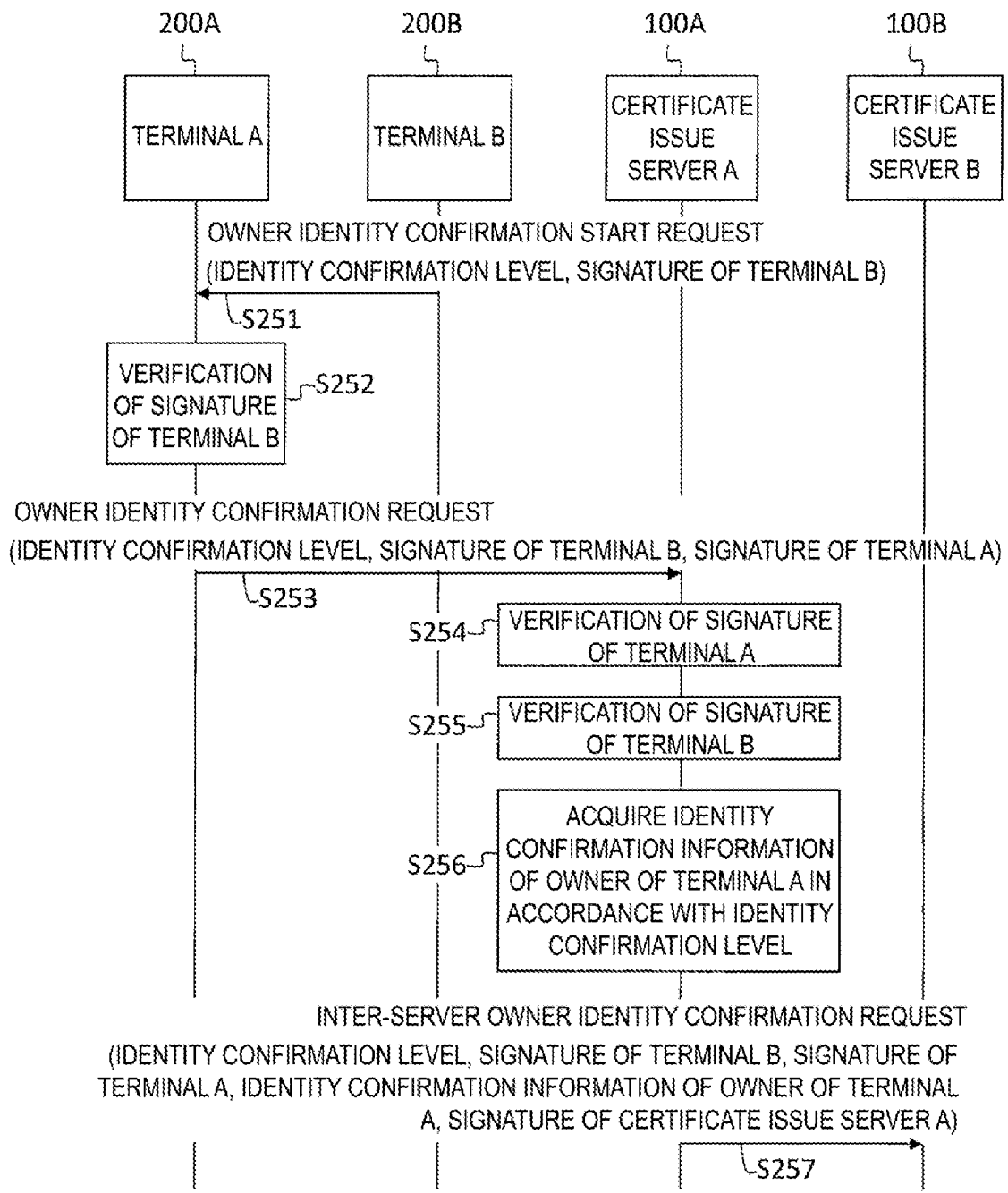
FIG. 11 is a sequence diagram (4) of the owner identity confirmation process performed by the owner identity confirmation system according to the first embodiment.
Figure 12:
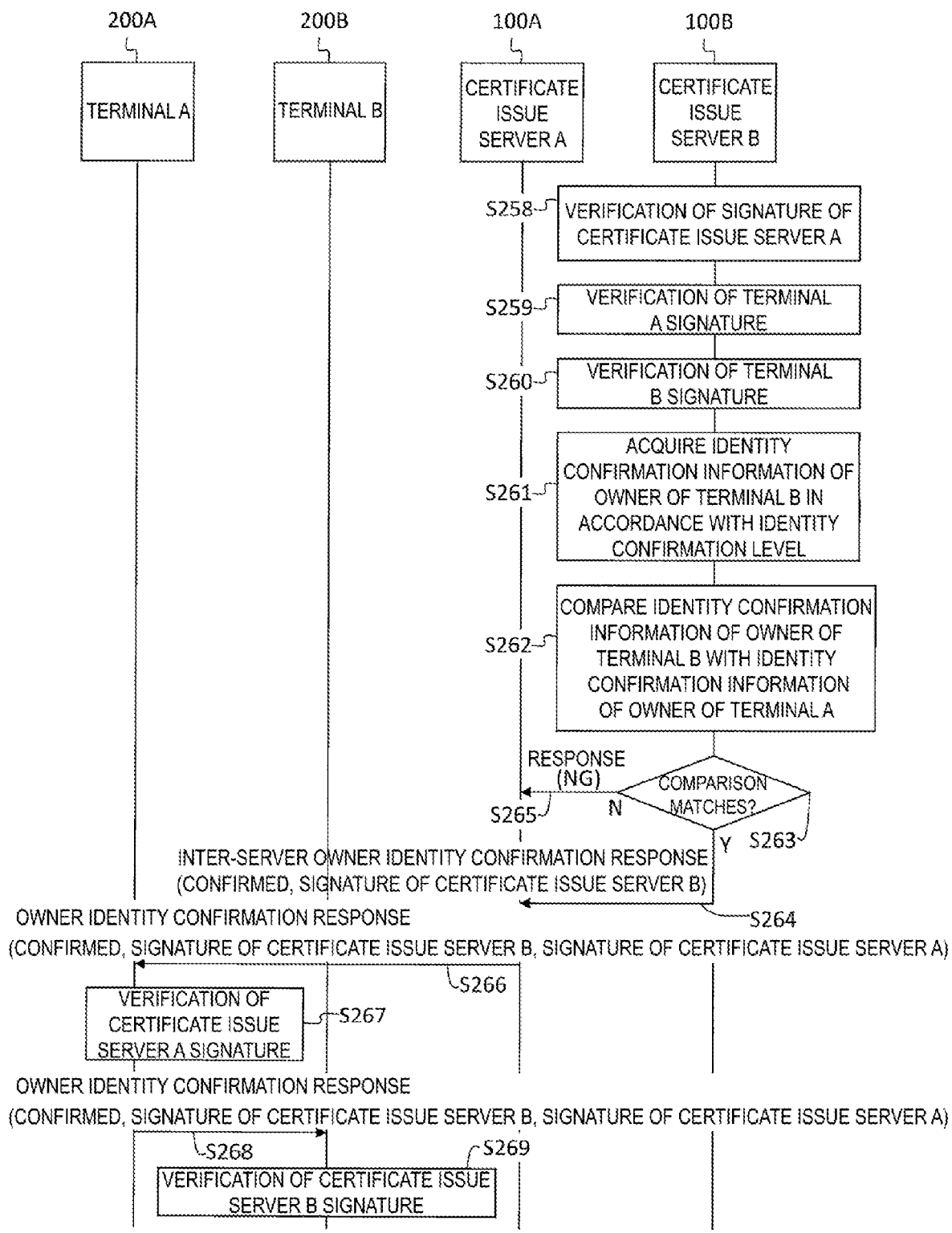
FIG. 12 is a sequence diagram (5) of the owner identity confirmation process performed by the owner identity confirmation system according to the first embodiment.

The process of steps S251 to S269 illustrated in FIG. 11 and FIG. 12 is a process similar to steps S221 to S239, in which the terminal A 200A and the terminal B 200B are replaced, and the certificate issue server A 100A and the certificate issue server B 100B are replaced.

Characteristics of Owner Identity Confirmation Process according to First Embodiment Even with terminals having different certificate issue servers as certificate issue sources, the owners can be confirmed to be the same, by exchanging identity confirmation information of the owners between the certificate issue servers of the certificate issue sources (see step S227 and step S257) to compare (see step S232 and step S262).

Identity confirmation information is exchanged only between the certificate issue servers 100 to compare by the processing procedure illustrated in FIG. 8 to FIG. 12. For this reason, even if a fraudulent party executes the owner identity confirmation process including a fraudulent terminal or a terminal acquired in a fraudulent manner, it is not possible to acquire the identity confirmation information of the owner of the terminal. Even with a terminal acquired in a fraudulent manner, by performing, by the terminal 200, identity confirmation of the owner of the terminal at the start of the owner identity confirmation process, it is possible to prevent the execution of the fraudulent owner identity confirmation process.

When the identity confirmation information of the terminal B 200B is transmitted from the certificate issue server B 100B to the certificate issue server A 100A (step S227), it is confirmed that the terminal B 200B (the owner of the terminal B 200B) has an intention to perform the owner identity confirmation process before by the certificate issue server B 100B verifying the signature of the terminal B 200B of the owner identity confirmation request (step S224). As a result, execution of the owner identity confirmation between the certificate issue servers and presentation of identity confirmation information to the certificate issue source certificate issue server of the owner identity confirmation target terminal not aimed by the terminal B 200B (the owner of the terminal B 200B) can be prevented. This is the same for the terminal A 200A.

The certificate issue server B 100B has the certificate issue source of the terminal that has transmitted the owner identity confirmation start request, as the certificate issue server of the transmission target of the inter-server owner identity confirmation request (step S227). For this reason, the inter-server owner identity confirmation request including the identity confirmation information is transmitted to the certificate issue source of the terminal that is willing to perform the owner identity confirmation process and is not transmitted to other certificate issue servers, and is not transmitted to an unintended certificate issue server or a fraudulent certificate issue server.

The certificate issue server 100 has transmitted, to the certificate issue server of the confirmation target, the identity confirmation information corresponding to the identity confirmation level specified by the terminal 200. By specifying the identity confirmation level as necessary and performing the owner identity confirmation process, it is possible to change the specificity of the identity confirmation information exchanged between the certificate issue servers (the type and number of items in the identity confirmation information), and transmission of unnecessary identity confirmation information can be suppressed.

After the certificate issue server 100 has confirmed the signature of the terminal by using the one time certificate issued by itself, the state of the one time certificate changes from "valid", to "server used", to "terminal used", to "invalid", or from "valid", to "terminal used", to "server used", to "invalid", to be used for only one time of the owner identity confirmation process (see steps S224, S230, S254, and S260). For this reason, replay attacks using one time certificates can be prevented.

Modification of First Embodiment: Key Pair Generation of One Time Certificate The certificate issue server 100 generates a key pair to transmit a one time certificate including a public key and a private key to the terminal 200 (see steps S204 and S208), but the terminal 200 may generate a key pair. Specifically, the terminal 200 may generate a key pair and transmit a one time certificate issue request including a generated public key to the certificate issue server 100, and the certificate issue server 100 may issue a one time certificate including the public key.

Modification of First Embodiment: Public Key Acquisition of Certificate Issue Server The public key 171 of the certificate issue server 100 is stored in the public key database 173 of the certificate issue server 100 or the public key database 223 of the terminal 200. Instead of such a database, the public key of the certificate issue server 100 may be acquired from a trusted third party. In addition to the one time certificate, a public key certificate issued by the root authentication station, including the public key of the certificate issue server 100 that has issued the one time certificate, may be attached to a message. The certificate issue server 100 and the terminal 200 verify the public key certificate issued by the root authentication station to acquire the public key of the certificate issue server 100, verify the one time certificate, and further verify the signature of the message.

Overview of Second Embodiment

In the second embodiment, the terminal generates the token (random number) at the start of the owner identity confirmation process, and the certificate issue server exchanges pairs of tokens (hereinafter also referred to as token pairs) generated by the two terminals to confirm that they are the same token pair before starting exchange of identity confirmation information between servers, and then transmits the identity confirmation information.

The message exchanged between the terminal and the certificate issue server in the owner identity confirmation process according to the second embodiment is substantially similar to the first embodiment except that the token pair is included. Hereinafter, a configuration of a terminal 600 (see FIG. 14 described later), a configuration of a certificate issue server 500 (see FIG. 13 described later), and a message different from the first embodiment will be mainly described.

Figure 13:
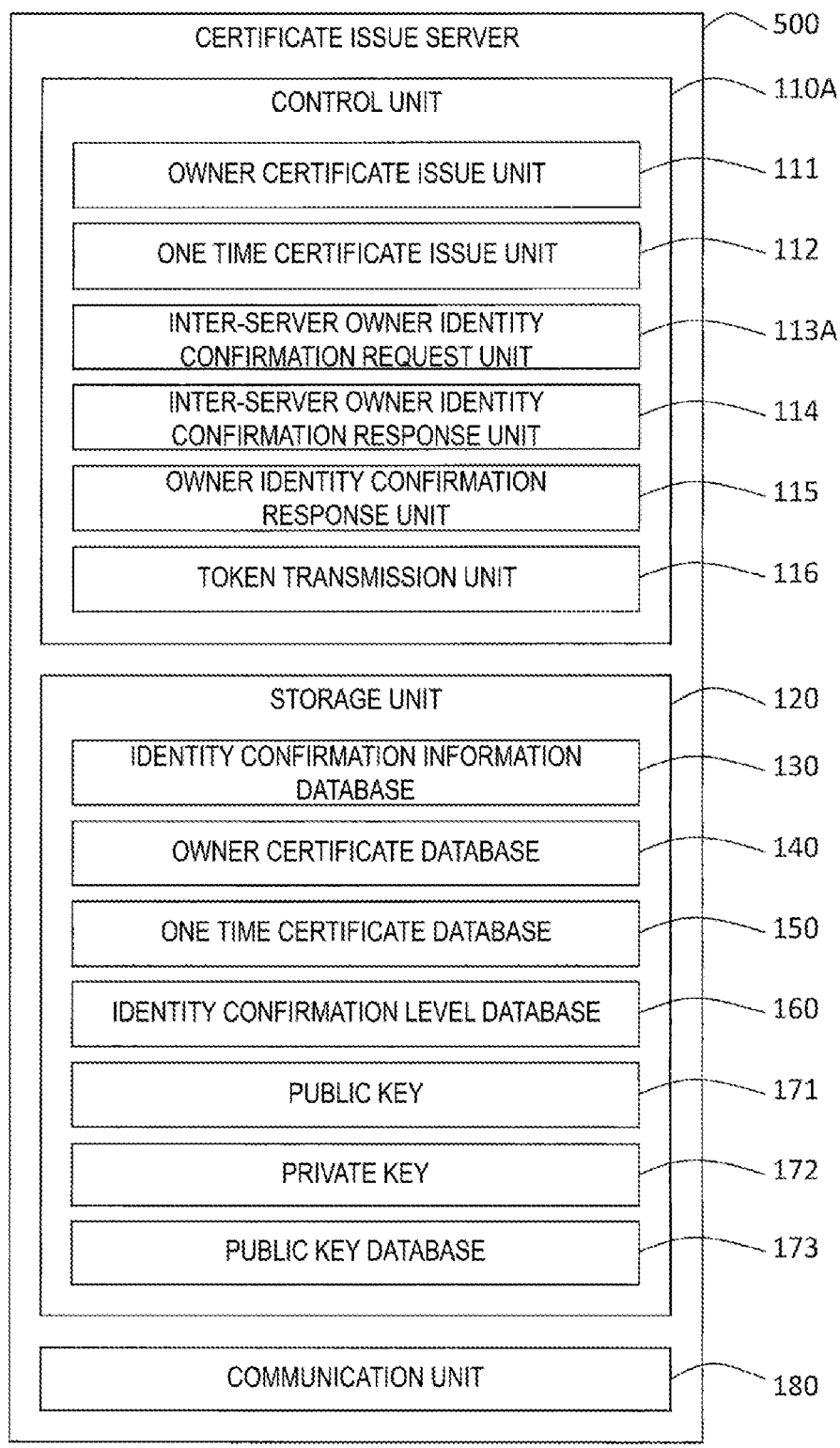
FIG. 13 is a diagram illustrating an overall configuration of a certificate issue server according to a second embodiment.

Overall Configuration of Certificate Issue Server according to Second Embodiment FIG. 13 is a diagram illustrating an overall configuration of a certificate issue server 500 according to the second embodiment. In comparison to the certificate issue server 100 (see FIG. 2), a control unit 110A differs in an inter-server owner identity confirmation request unit 113A and is added with a token transmission unit 116.

The token transmission unit 116 receives an owner identity confirmation request including a token pair from the terminal 600 and sends the token pair to the certificate issue source of the target terminal.

The inter-server owner identity confirmation request unit 113A compares the token pair received from the certificate issue server 500, which is the certificate issue source of the target terminal, with the token pair received from the terminal 600 and, if they are the same, transmits an inter-server owner identity confirmation request including the identity confirmation information of the terminal 600 acquired from its own identity confirmation information database 130 to the certificate issue server (the confirmation target certificate issue server) 500 of the target terminal.

Overall Configuration of Terminal according to Second Embodiment

Figure 14:
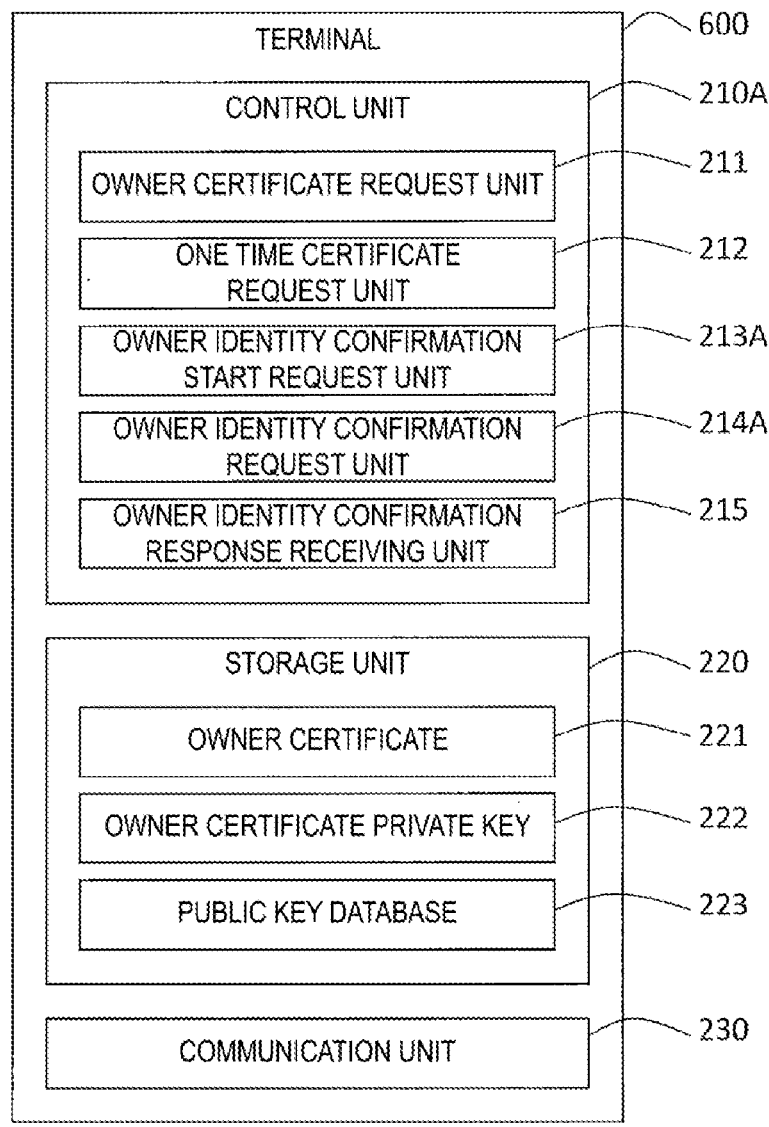
FIG. 14 is a diagram illustrating an overall configuration of a terminal according to the second embodiment.

FIG. 14 is a diagram illustrating an overall configuration of a terminal 600 according to the second embodiment. Compared to the terminal 200 (see FIG. 7), a control unit 210A differs in an owner identity confirmation start request unit 213A and an owner identity confirmation request unit 214A.

The owner identity confirmation start request unit 213A generates a token and transmits an owner identity confirmation start request including the token to the target terminal. The owner identity confirmation request unit 214A includes the token generated by itself to the received owner identity confirmation start request, and transmits it as the owner identity confirmation request to the certificate issue server 500.

Owner Identity Confirmation Process according to Second Embodiment

FIG. 15 to FIG. 20 are sequence diagrams of an owner identity confirmation process performed by an owner identity confirmation system according to the second embodiment. With reference to FIG. 15 to FIG. 20, the owner identity confirmation process performed by the owner identity confirmation system including a terminal A 600A, a terminal B 600B, a certificate issue server A 500A, and a certificate issue server B 500B will be described.

Owner Identity Confirmation Process: Process from Issuing One Time Certificate until Exchange (FIG. 15)

Figure 15:
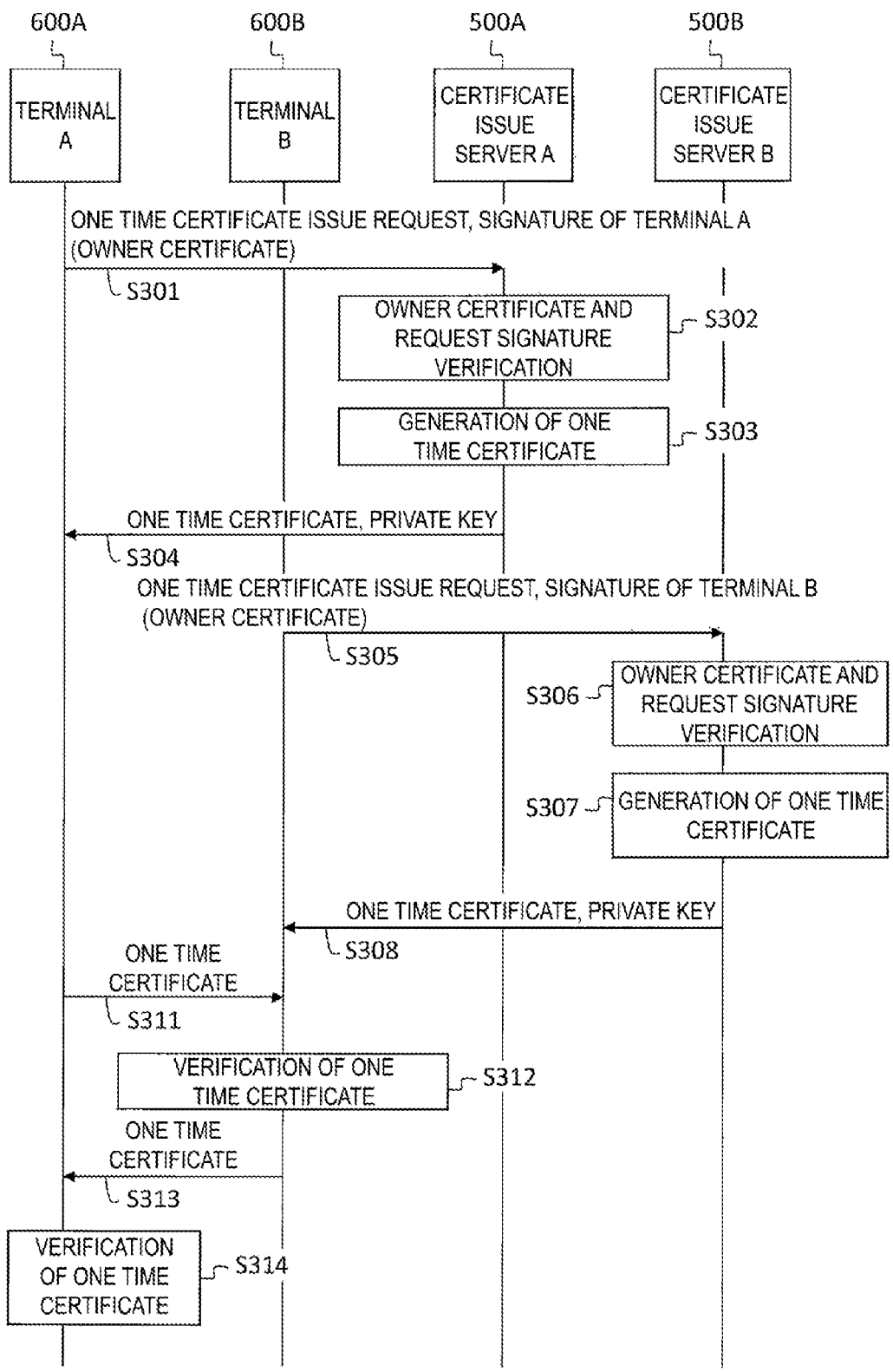
FIG. 15 is a sequence diagram (1) of an owner identity confirmation process performed by an owner identity confirmation system according to the second embodiment.

In FIG. 15, steps S301 to S308 and S311 to S314 are processes similar to steps S201 to S208 and S211 to S214 (see FIG. 8), respectively.

Owner Identity Confirmation Process: Token Generation, Owner Identity Confirmation Start, Owner Identity Confirmation (FIG. 16)

Figure 16:
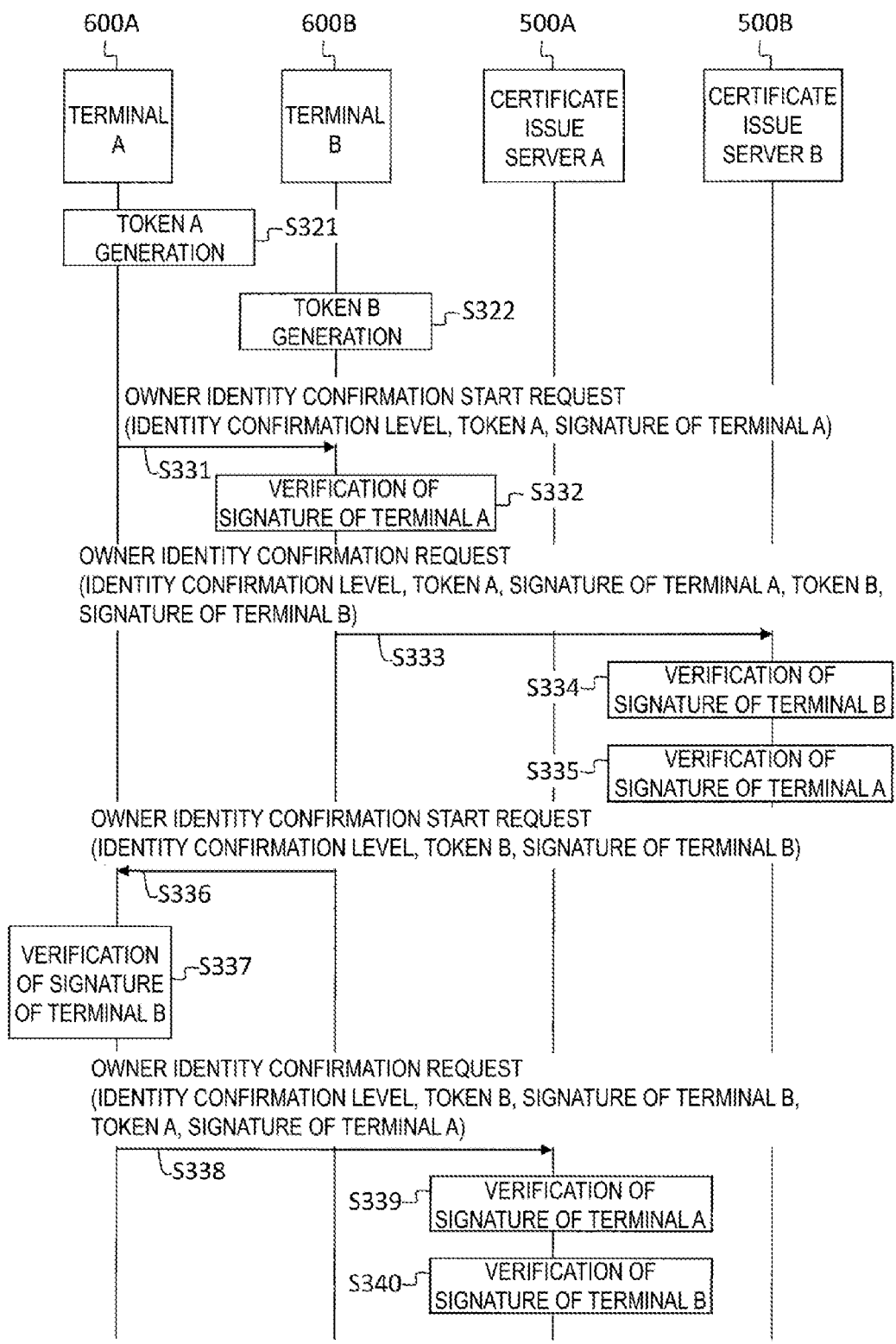
FIG. 16 is a sequence diagram (2) of the owner identity confirmation process performed by the owner identity confirmation system according to the second embodiment.

Proceeding to FIG. 16, in step S321, the owner identity confirmation start request unit 213A of the terminal A 600A generates a random number as a token A.

In step S322, the owner identity confirmation start request unit 213A of the terminal B 600B generates a random number as a token B.

In step S331, similar to step S221 (see FIG. 9), the owner identity confirmation start request unit 213A of the terminal A 600A transmits an owner identity confirmation start request to the terminal B 600B, which is the owner identity confirmation target terminal. Different from step S221 is that the request includes the token A (also referred to as the owner identity confirmation start random number) generated in step S321.

In step S332, similar to step S222, the owner identity confirmation request unit 214A of the terminal B 600B verifies the signature of the terminal A provided to the owner identity confirmation start request. Different from step S222 is that the owner identity confirmation start request includes the token A.

In step S333, the owner identity confirmation request unit 214A includes a token B (also referred to as an owner identity confirmation request random number) in the received owner identity confirmation start request, provides a signature (a signature of the terminal B) by using a one time private key, and transmits it to the certificate issue server B 500B as the owner identity confirmation request. The owner identity confirmation request includes the token A, and the token A is provided with the signature of the terminal A and the signature of the terminal B.

In step S334, the token transmission unit 116 of the certificate issue server B 500B verifies the signature of the terminal B provided to the owner identity confirmation request, similar to the inter-server owner identity confirmation request unit 113 in step S224. Different from step S224 is that the owner identity confirmation request includes the token A and the token B.

In step S335, the token transmission unit 116 of the certificate issue server B 500B verifies the signature of the terminal A provided to the owner identity confirmation request, similar to the inter-server owner identity confirmation request unit 113 in step S225. Different from step S225 is that the owner identity confirmation request includes the token A and the token B.

Step S336 to S340 are processes similar to step S331 to S335 in which the terminal A 600A and the terminal B 600B are replaced and the certificate issue server A 500A and the certificate issue server B 500B are replaced.

Owner Identity Confirmation Process: After Inter-Server Owner Identity Confirmation (FIG. 17 to FIG. 18)

Figure 17:
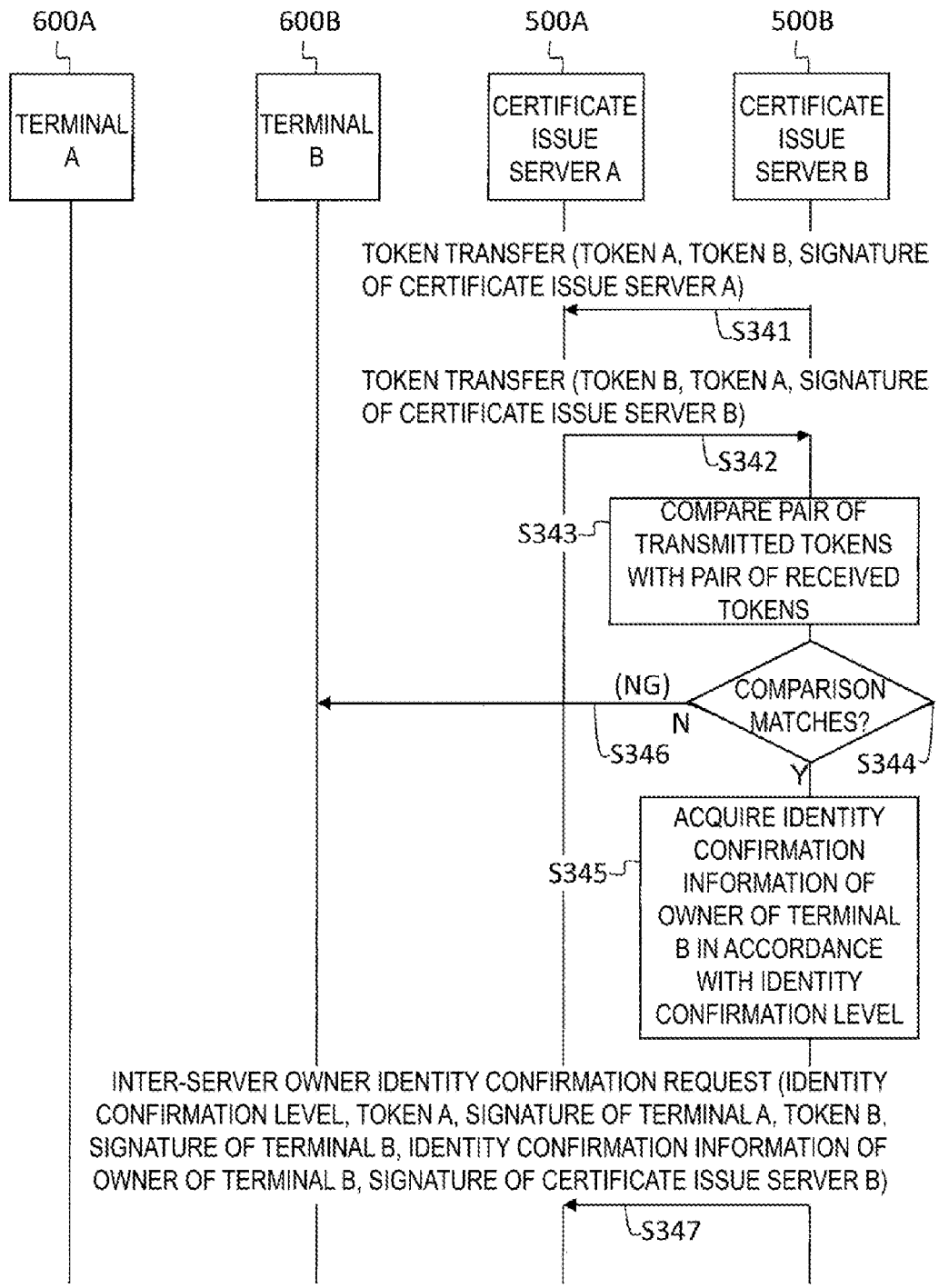
FIG. 17 is a sequence diagram (3) of the owner identity confirmation process performed by the owner identity confirmation system according to the second embodiment.
Figure 18:
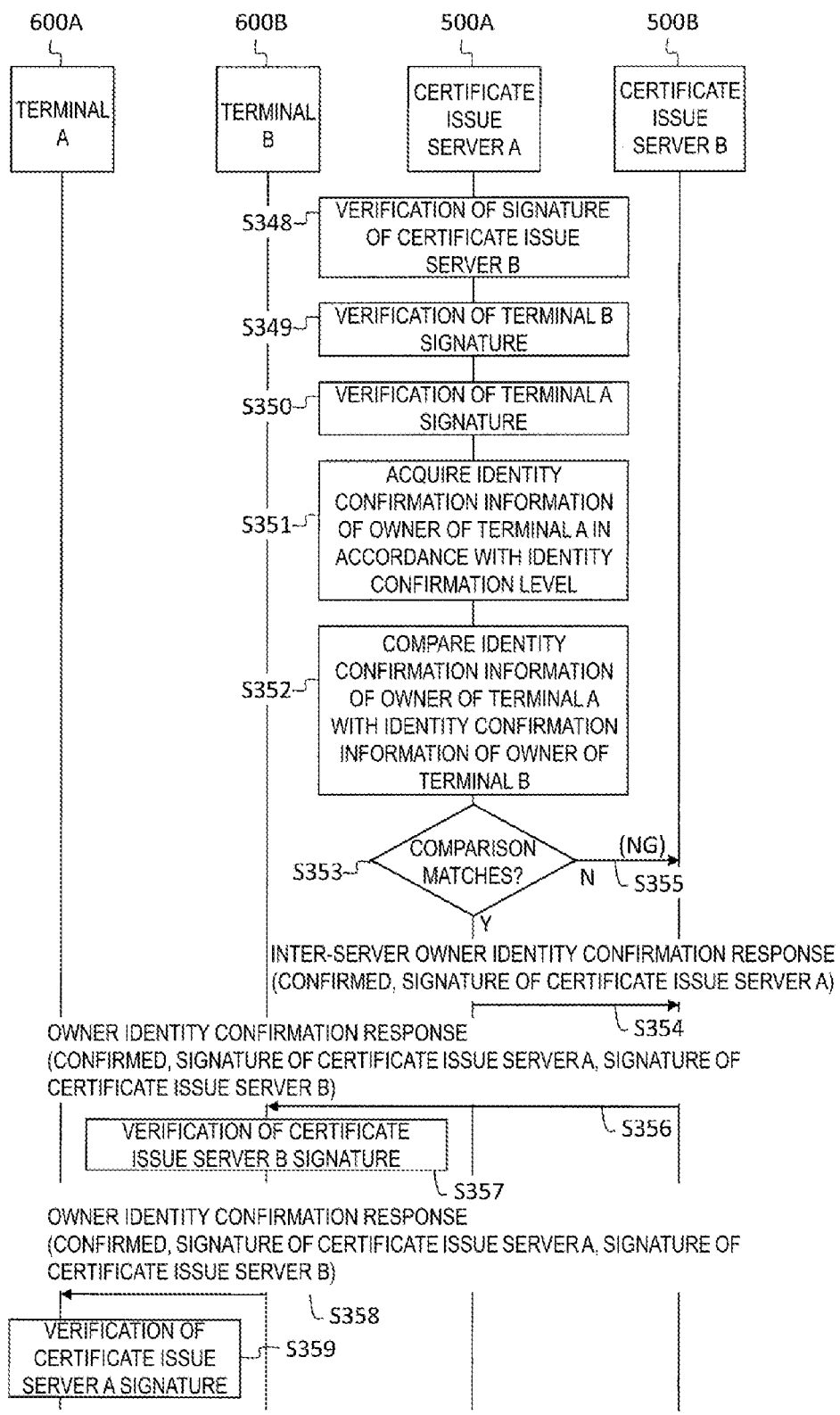
FIG. 18 is a sequence diagram (4) of the owner identity confirmation process performed by the owner identity confirmation system according to the second embodiment.

Proceeding to FIG. 17, in step S341, the token transmission unit 116 of the certificate issue server B 500B generates and provides a signature by using the private key 172 to the token A and the token B included in the owner identity confirmation request received in step S333 and transmits it to the certificate issue server A 500A.

Note that the certificate issue server A 500A, which is the transmission target here, is a certificate issue source of the terminal A 600A verified in step S335 (the terminal that has transmitted the owner identity confirmation start request), and is a certificate issue server identified as the issue source of the one time certificate of the terminal A.

Step S342 is a similar process in which the certificate issue server A 500A and the certificate issue server B 500B are replaced.

Note that the order of steps S341 and S342 may be reversed.

In step S343, the inter-server owner identity confirmation request unit 113A of the certificate issue server B 500B checks if the token pair transmitted in step S341 and the token pair received in step S342 are the same token A and token B pair.

In step S344, the inter-server owner identity confirmation request unit 113A proceeds to step S345 in the case that the comparison matches (step S344 to Y), or proceeds to step S346 in the case that the comparison does not match (step S344 to N).

Step S345 is a similar process to step S226 (see FIG. 9).

In step S346, the inter-server owner identity confirmation request unit 113A of the certificate issue server B 500B stops the owner identity confirmation process if the token pair comparison fails, and transmits an error message to the terminal B 600B. The error message is also transmitted to the certificate issue server A 500A (not shown in FIG. 17).

Step S347 is a similar process to step S227 (see FIG. 9). A difference from step S227 is that the inter-server owner identity confirmation request includes the token A and the token B.

Proceeding to FIG. 18, step S348 to S359 are similar processes to step S228 to S239 (see FIG. 10).

Owner Identity Confirmation Process: Process Symmetric with FIG. 17 to FIG. 18 (FIG. 19 to FIG. 20)

Figure 19:
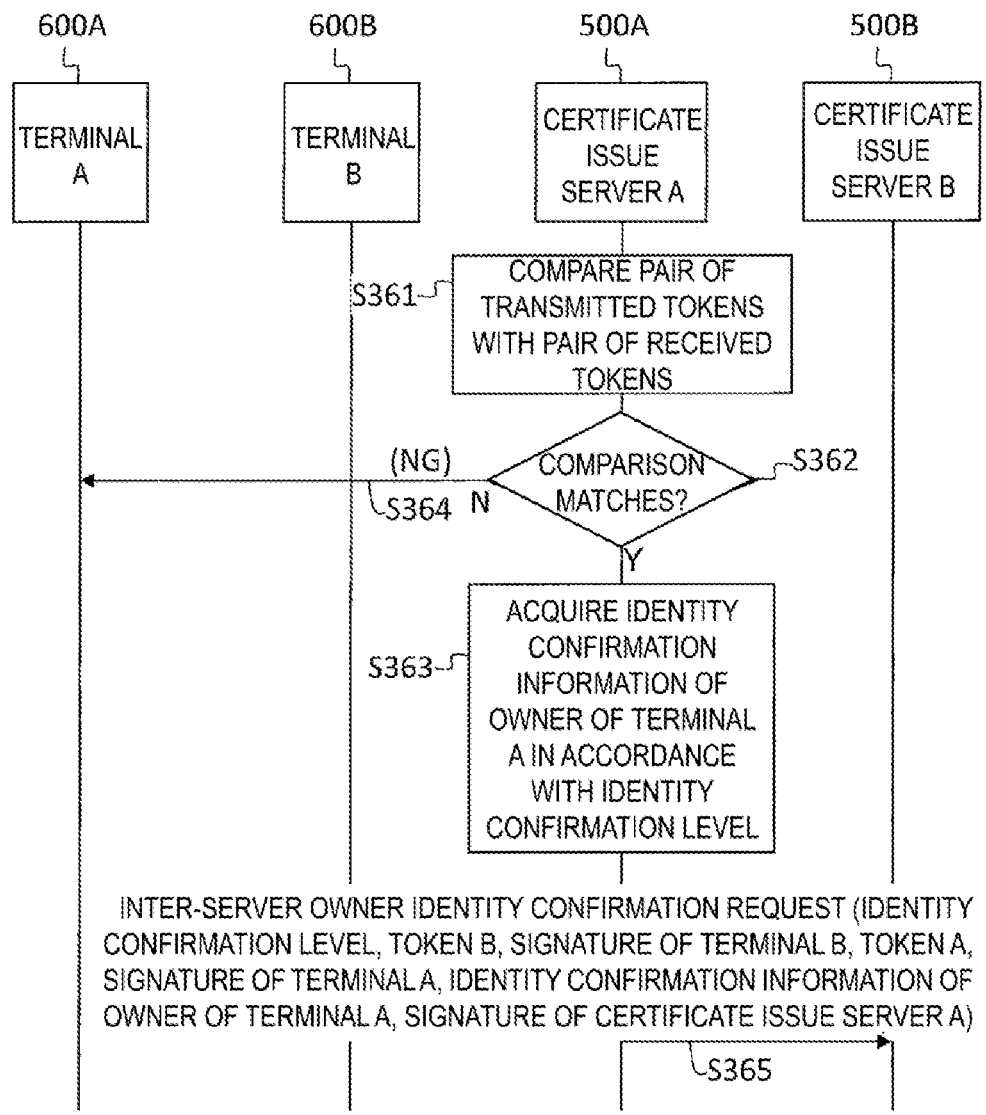
FIG. 19 is a sequence diagram (5) of the owner identity confirmation process performed by the owner identity confirmation system according to the second embodiment.
Figure 20:
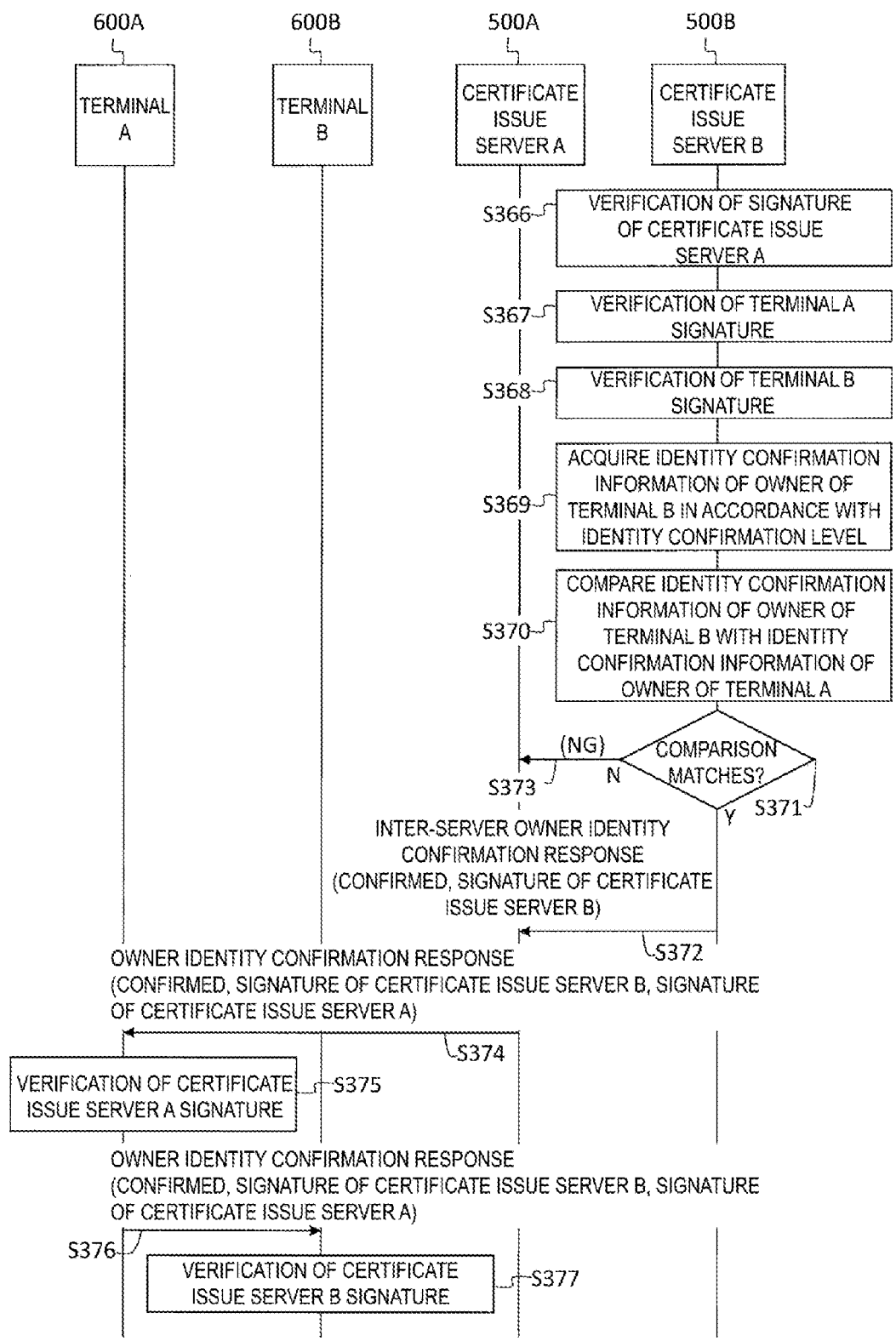
FIG. 20 is a sequence diagram (6) of the owner identity confirmation process performed by the owner identity confirmation system according to the second embodiment.
Figure 21:
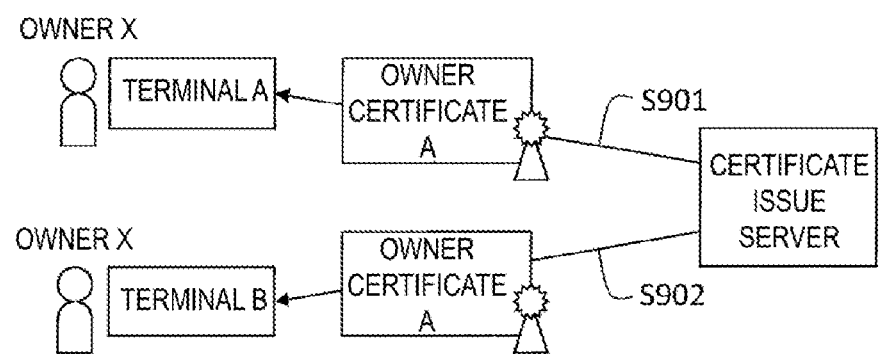
FIG. 21 is a diagram illustrating a certificate issue server issuing an owner certificate to a terminal according to related art.
Figure 22:
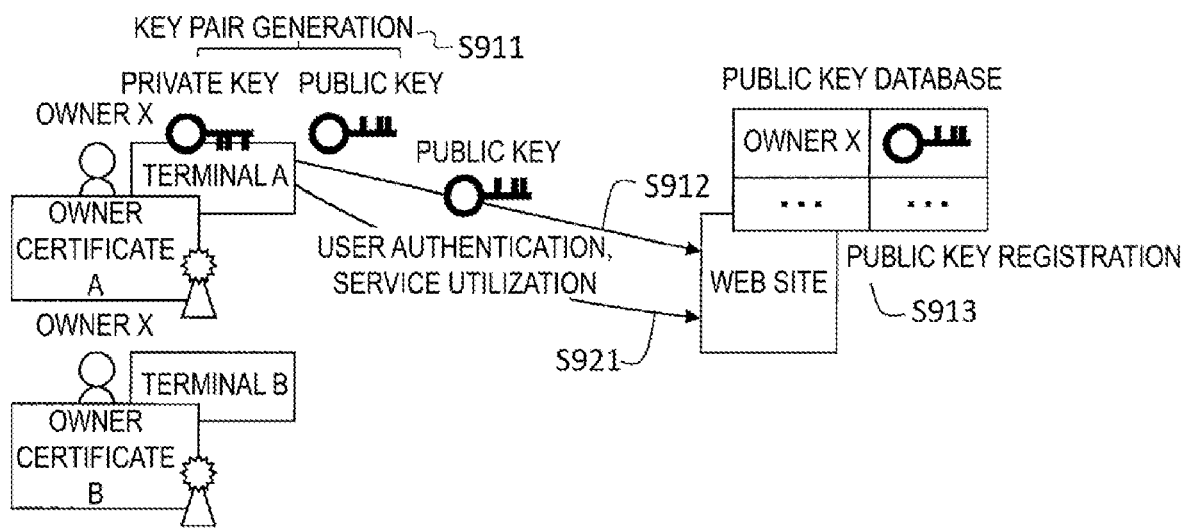
FIG. 22 is a diagram illustrating a user registration process to a Web site according to related art.
Figure 23:
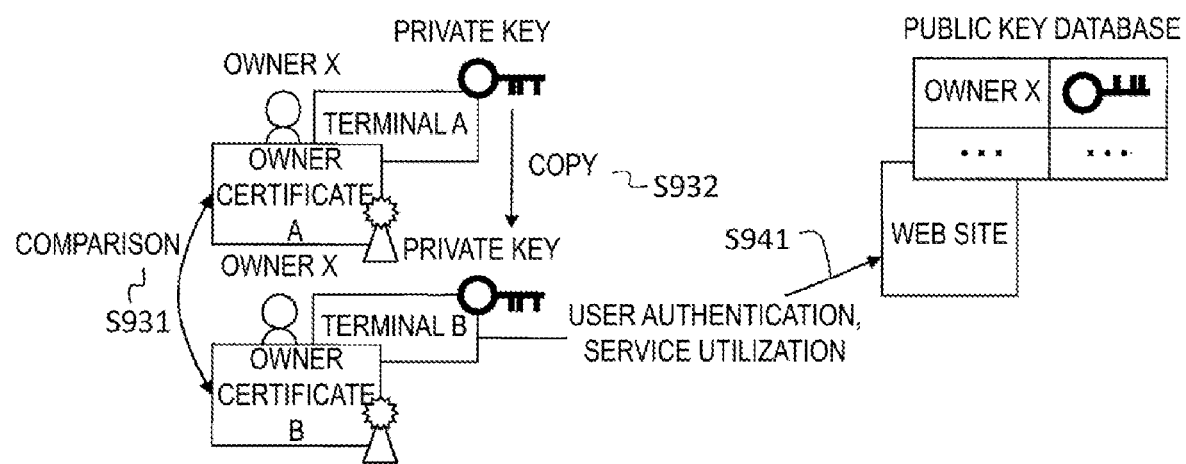
FIG. 23 is a diagram illustrating a copy process of a private key between terminals owned by the same owner according to related art.

The process of steps S361 to S377 illustrated in FIG. 19 and FIG. 20 is a process similar to steps S343 to S359, in which the terminal A 600A and the terminal B 600B are replaced, and the certificate issue server A 500A and the certificate issue server B 500B are replaced.

Characteristics of Owner Identity Confirmation Process according to Second Embodiment In the second embodiment, after the certificate issue server 500 has confirmed that the transmitted token pair matches the received token pair (see steps S343, S361), the identity confirmation information stored by itself is transmitted to the certificate issue server 500 of the partner terminal. For this reason, even when a replay attack using a message transmitted by the terminal A 600A or the terminal B 600B is attempted to perform, the identity confirmation information will not be transmitted from the certificate issue server 500 unless the token pairs match, so it is possible to improve the difficulty of replay attacks and suppress attacks.

Even if the terminal A 600A and the terminal B 600B perform the owner identity confirmation process a plurality of times at approximately the same time, the process can proceed by identifying which owner identity confirmation process it is without confusing each owner identity confirmation process, and the safety can be further enhanced.

Modification of Second Embodiment: Server Generates Token

In the second embodiment, the terminal 600 generates a token that is a random number (see steps S321 and S322 as described in FIG. 16). Instead of the terminal 600, the certificate issue server 500 may generate and transmit a token to the terminal 600.

Specifically, the certificate issue server 500 may generate a token at the same time as generation of a one time certificate (see steps S303 and S307 as described in FIG. 15) and transmit the generated token together with the one time certificate and the private key to the terminal 600 (see steps S304 and S308 described as described in FIG. 15). The terminal 600 transmits the owner identity confirmation start request or the owner identity confirmation request including the received token instead of the generated token to the owner identity confirmation target terminal or the certificate issue source certificate issue server 500.

Modification of Second Embodiment: Verification Method of Token

As a verification method of a token (random number verification method), in the second embodiment, the certificate issue servers 500 transmit the token included in the owner identity confirmation request to each other (see steps S341 and S342 as described in FIG. 17) to compare, and transmits the identity confirmation information to the partner certificate issue server (confirmation target certificate issue server) 500 (step S343 to S347 described in FIG. 17, steps S361 to S365 as described in FIG. 19).

Instead of transmitting to each other and comparing, the token may be confirmed if being used for a plurality of times. Specifically, the certificate issue server 500 stores the token included in the owner identity confirmation request (see steps S333 and S338 as described in FIG. 16) as the used token, and stops the owner identity confirmation process if the used token is included in the owner identity confirmation request.

Modification of First and Second Embodiments: Verification of One Time Certificate In the first and second embodiment, use of the one time certificate is limited as one time by referring to the state 154 of the one time certificate database 150 (step S224 as described in FIG. 9, step S230 as described in FIG. 10, step S254 as described in FIG. 11, step S260 as described in FIG. 12). Instead of this, the inter-server owner identity confirmation request unit 113 may store the one time certificate that has been provided to a previously received owner identity confirmation request and confirm that a one time certificate that is provided to a newly received owner identity confirmation request is not included in the stored one time certificate.

Modification of First and Second Embodiments: Association of One Time Certificate and Identity Confirmation Information In the first embodiment, the certificate issue server 100 references the owner certificate database 140 to acquire the owner identifier corresponding to the terminal identifier included in the one time certificate of the terminal 200 that has transmitted the owner identity confirmation request. Next, the certificate issue server 100 references the identity confirmation information database 130 to acquire the identity confirmation information corresponding to the owner identifier, and transmits the inter-server owner identity confirmation request including it to the confirmation target certificate issue server (see steps S226 to S227 as described in FIG. 9, steps S256 to S257 as described in FIG. 11). The same applies to the second embodiment (steps S345 and S347 as described in FIG. 17, steps S363 and S365 as described in FIG. 19).

The one time certificate may include information that can associate the owner of the terminal instead of the terminal identifier (owner association information), and the certificate issue server 100 may acquire the identity confirmation information corresponding to the owner association information and transmit the inter-server owner identity confirmation request including it to the confirmation target certificate issue server. Thus, information that associates the signature of the terminal and the one time certificate is also referred to as the owner server association information.

The owner association information may also be a certificate identifier of a one time certificate (certificate identifier 152 as described in FIG. 5). Specifically, the one time certificate database 150 adds attributes of the owner identifier corresponding to the owner identifier 131 of the identity confirmation information database 130 (see FIG. 3). The one time certificate issue unit 112 acquires the owner identifier (see the owner identifier 141 as described in FIG. 4) corresponding to the verified owner certificate (see steps S202 and S206 as described in FIG. 8) when issuing the one time certificate (see steps S203 and S207 as described in FIG. 8), and stores it in the owner identifier of the one time certificate database 150.

When acquiring the identity confirmation information (step S226 as described in FIG. 9, step S231 as described in FIG. 10, step S256 as described in FIG. 11, step S261 as described in FIG. 12), the inter-server owner identity confirmation request unit 113 and the inter-server owner identity confirmation response unit 114 may search in the one time certificate database 150 to acquire the owner identifier corresponding to the certificate identifier included in the one time certificate, and acquire the identity confirmation information from the identity confirmation information database 130.

In the above-described modifications, the terminal identifier included in the one time certificate is not referenced, so the one time certificate may not include the terminal identifier.

Other examples of the owner association information include a certificate identifier of the owner certificate. The one time certificate issue unit 112 includes a certificate identifier of the owner certificate when issuing the one time certificate. The inter-server owner identity confirmation request unit 113 acquires, by referring to the owner certificate database 140, the owner identifier corresponding to the certificate identifier of the owner certificate included in the one time certificate, and acquires the identity confirmation information corresponding to the owner identifier by referencing the identity confirmation information database 130.

Modification of Second Embodiment: Modification of Control Unit

The token transmission unit 116 for transmitting the token in steps S341 and S342 (see FIG. 17) is provided in the certificate issue server 500, but the token transmission unit 116 may be included in the inter-server owner identity confirmation request unit 113A.

REFERENCE SIGNS LIST 100, 500 Certificate issue server (terminal management server)
111 Owner certificate issue unit
112 One time certificate issue unit
113, 113A Inter-server owner identity confirmation request unit
114 Inter-server owner identity confirmation response unit
115 Owner identity confirmation response unit
116 Token transmission unit
130 Identity confirmation information database
140 Owner certificate database
150 One time certificate database
160 Identity confirmation level database
171 Public key
172 Private key
173 Public key database
200, 600 Terminal
211 Owner certificate request unit
212 One time certificate request unit
213, 213A Owner identity confirmation start request unit
214, 214A Owner identity confirmation request unit
215 Owner identity confirmation response receiving unit
221 Owner certificate 222 Owner certificate private key
223 Public key database

The invention claimed is:

1. An owner identity confirmation system, including one or more computers comprising one or more processors, in which a terminal and a terminal management server storing identity confirmation information of an owner of the terminal in a storage unit are connected through a communication network, the owner identity confirmation system confirming that two of the terminals are owned by a same owner, wherein the terminal includes:

an owner identity confirmation start request unit, implemented with the one or more processors, configured to transmit an owner identity confirmation start request to a confirmation target terminal indicating a terminal being a target of owner identity confirmation, the owner identity confirmation start request including owner server association information being information capable of identifying an owner of the terminal itself and a management source terminal management server indicating a terminal management server storing the identity confirmation information of the owner of the terminal itself;

an owner identity confirmation request unit, implemented with the one or more processors, configured to, when receiving the owner identity confirmation start request, transmit an owner identity confirmation request to the management source terminal management server of the terminal itself, the owner identity confirmation request including owner identity confirmation start owner server association information indicating the owner server association information included in the owner identity confirmation start request and owner identity confirmation request owner server association information indicating the owner server association information of the owner of the terminal itself; and an owner identity confirmation response receiving unit, implemented with the one or more processors, configured to receive, from the management source terminal management server of the terminal itself, an owner identity confirmation response being a response to the owner identity confirmation request, and wherein the terminal management server includes:

an inter-server owner identity confirmation request unit, implemented with the one or more processors, configured to, when receiving the owner identity confirmation request from the terminal, transmit an inter-server owner identity confirmation request including: i) the owner identity confirmation start owner server association information included in the owner identity confirmation request, ii) the owner identity confirmation request owner server association information included in the owner identity confirmation request, and iii) the identity confirmation information of the owner that is identified by the owner identity confirmation request owner server association information and acquired from the storage unit, to a confirmation target terminal management server indicating the management source terminal management server of the terminal identified by the owner identity confirmation start owner server association information;

an inter-server owner identity confirmation response unit, implemented with the one or more processors, configured to, when receiving the inter-server owner identity confirmation request:

acquire from the storage unit the identity confirmation information of the owner identified by the owner identity confirmation start owner server association information included in the inter-server owner identity confirmation request, compare the acquired identity confirmation information with the identity confirmation information included in the inter-server owner identity confirmation request, determine whether or not the acquired identity confirmation information and the identity confirmation information indicate the same owner, and transmit an inter-server owner identity confirmation response including a determination result to the terminal management server of a transmission source of the inter-server owner identity confirmation request; and an owner identity confirmation response unit, implemented with the one or more processors, configured to, when receiving the inter-server owner identity confirmation response, transmit the owner identity confirmation response regarded as the inter-server owner identity confirmation response to the terminal of a transmission source of the owner identity confirmation request.

2. The owner identity confirmation system according to claim 1, wherein:

the owner identity confirmation start request unit included in the terminal generates by the terminal itself, or acquires from the management source terminal management server of the terminal itself, a random number, and includes the random number as an owner identity confirmation start random number in the owner identity confirmation start request, the owner identity confirmation request unit included in the terminal includes, in the owner identity confirmation request, the owner identity confirmation start random number included in the owner identity confirmation start request received and the random number generated or acquired by the owner identity confirmation start request unit as an owner identity confirmation request random number, and the inter-server owner identity confirmation request unit included in the terminal management server verifies the owner identity confirmation start random number and the owner identity confirmation request random number included in the owner identity confirmation request by using a predetermined random number verification method, and transmits the inter-server owner identity confirmation request to the confirmation target terminal management server after successful verification.

3. The owner identity confirmation system according to claim 2, wherein:

in verification of the owner identity confirmation start random number and the owner identity confirmation request random number, the inter-server owner identity confirmation request unit included in the terminal management server:

transmits, to the confirmation target terminal management server, the owner identity confirmation start random number and the owner identity confirmation request random number included in the owner identity confirmation request, receives the owner identity confirmation start random number and the owner identity confirmation request random number as the confirmation target terminal management server, and confirms that the owner identity confirmation start random number received is identical to the owner identity confirmation request random number transmitted by the terminal management server itself, and that the owner identity confirmation request random number received is identical to the owner identity confirmation start random number transmitted by the terminal management server itself.

4. The owner identity confirmation system according to claim 2, wherein:
in verification of the owner identity confirmation start random number and the owner identity confirmation request random number, the inter-server owner identity confirmation request unit included in the terminal management server:
confirms, when receiving the owner identity confirmation request, that the owner identity confirmation start random number and the owner identity confirmation request random number included in the owner identity confirmation request do not match the owner identity confirmation start random number and the owner identity confirmation request random number included in another owner identity confirmation request received before receiving the owner identity confirmation request.

5. The owner identity confirmation system according to claim 1, wherein:
the owner identity confirmation start request unit included in the terminal includes, in the owner identity confirmation start request, an identity confirmation level indicating specificity of the identity confirmation information to be verified by the inter-server owner identity confirmation response unit included in the terminal management server,
the owner identity confirmation request unit included in the terminal includes, in the owner identity confirmation request, the identity confirmation level included in the owner identity confirmation start request received, and
the inter-server owner identity confirmation request unit included in the terminal management server acquires, from the storage unit, the identity confirmation information having the specificity according to the identity confirmation level included in the owner identity confirmation request received, and includes the identity confirmation information in the inter-server owner identity confirmation request, and
wherein the inter-server owner identity confirmation response unit included in the terminal management server:
acquires, from the storage unit, the identity confirmation information of the owner identified by the owner identity confirmation start owner server association information included in the inter-server owner identity confirmation request, the identity confirmation information of the owner being corresponding to the identity confirmation level included in the inter-server owner identity confirmation request, and
compares the acquired identity confirmation information with the identity confirmation information included in the inter-server owner identity confirmation request.

6. The owner identity confirmation system according to claim 1, wherein:
the owner server association information is a public key certificate including:

a signature that is generated by the terminal and added to i) the owner identity confirmation start request, ii) the owner identity confirmation request, and iii) the inter-server owner identity confirmation request, and identification information associated with i) the identity confirmation information stored in the storage unit, ii) a public key for verifying the signature, and iii) identification information of the management source terminal management server of the terminal, and
wherein the inter-server owner identity confirmation request unit included in the terminal management server transmits the inter-server owner identity confirmation request to the confirmation target terminal management server after successful verification of the signature that is generated by the terminal and added to the owner identity confirmation request.

7. The owner identity confirmation system according to claim 6, wherein:
the terminal includes a one time certificate request unit, implemented with the one or more processors, configured to request and newly acquire the public key certificate from the management source terminal management server of the terminal itself when the owner identity confirmation start request unit transmits the owner identity confirmation start request, and
wherein the inter-server owner identity confirmation request unit included in the terminal management server is configured to, when receiving the owner identity confirmation request, transmit the inter-server owner identity confirmation request to the confirmation target terminal management server after confirming that:
the public key certificate included in the owner identity confirmation start owner server association information and the owner identity confirmation request owner server association information included in the owner identity confirmation request does not match the public key certificate included in the owner identity confirmation start owner server association information and the owner identity confirmation request owner server association information included in another owner identity confirmation request received before reception of the owner identity confirmation request.

8. The owner identity confirmation system according to claim 7, wherein:
the inter-server owner identity confirmation response unit included in the terminal management server adds the signature of the terminal management server itself to the inter-server owner identity confirmation response, and
the owner identity confirmation response unit included in the terminal management server transmits the owner identity confirmation response after successful verification of the signature of the terminal management server added to the inter-server owner identity confirmation response.

9. A terminal management server connected to a terminal through a communication network, the terminal management server storing identity confirmation information of an owner of the terminal in a storage unit and confirming that two of the terminals are owned by a same owner, the terminal management server comprising:
an inter-server owner identity confirmation request unit, implemented with one or more processors, configured to transmit an owner identity confirmation request, when receiving (i) from a terminal that has received an owner identity confirmation start request including owner server association information comprising information capable of identifying an owner of the terminal itself and (ii) from a management source terminal management server indicating a terminal management server storing the identity confirmation information of the owner of the terminal itself, the owner identity confirmation request including:

owner identity confirmation start owner server association information indicating the owner server association information included in the owner identity confirmation start request, and owner identity confirmation request owner server association information indicating the owner server association information of the owner of the terminal itself, the inter-server owner identity confirmation request unit configured to transmit an inter-server owner identity confirmation request, that includes i) the owner identity confirmation start owner server association information included in the owner identity confirmation request, ii) the owner identity confirmation request owner server association information included in the owner identity confirmation request, and iii) the identity confirmation information of the owner that is identified by the owner identity confirmation request owner server association information and acquired from the storage unit, to a confirmation target terminal management server indicating a management source terminal management server of the terminal identified by the owner identity confirmation start owner server association information;

an inter-server owner identity confirmation response unit, implemented with the one or more processors, configured to, when receiving the inter-server owner identity confirmation request:

acquire from the storage unit the identity confirmation information of the owner identified by the owner identity confirmation start owner server association information included in the inter-server owner identity confirmation request, compare the acquired identity confirmation information with the identity confirmation information included in the inter-server owner identity confirmation request, determine whether or not these indicate the same owner, and transmit an inter-server owner identity confirmation response including a determination result to the terminal management server of a transmission source of the inter-server owner identity confirmation request; and an owner identity confirmation response unit, implemented with the one or more processors, configured to, when receiving the inter-server owner identity confirmation response:

transmit an owner identity confirmation response regarded as the inter-server owner identity confirmation response to the terminal of a transmission source of the owner identity confirmation request.

10. An owner identity confirmation method for an owner identity confirmation system, implemented with one or more processors, in which a terminal and a terminal management server storing identity confirmation information of an owner of the terminal in a storage unit are connected through a communication network, the owner identity confirmation system confirming that two of the terminals are owned by a same owner, the owner identity confirmation method comprising:

by the terminal:

transmitting an owner identity confirmation start request to a confirmation target terminal indicating a terminal being a target of owner identity confirmation, the owner identity confirmation start request including i) owner server association information being information capable of identifying an owner of the terminal itself and ii) a management source terminal management server indicating a terminal management server storing the identity confirmation information of the owner of the terminal itself;

when receiving the owner identity confirmation start request, transmitting an owner identity confirmation request to the management source terminal management server of the terminal itself, the owner identity confirmation request including i) owner identity confirmation start owner server association information indicating the owner server association information included in the owner identity confirmation start request and ii) owner identity confirmation request owner server association information indicating the owner server association information of the owner of the terminal itself; and receiving, from the management source terminal management server of the terminal itself, an owner identity confirmation response being a response to the owner identity confirmation request, and by the terminal management server:

when receiving the owner identity confirmation request from the terminal, transmitting an inter-server owner identity confirmation request including i) the owner identity confirmation start owner server association information included in the owner identity confirmation request, ii) the owner identity confirmation request owner server association information included in the owner identity confirmation request, and iii) the identity confirmation information of the owner that is identified by the owner identity confirmation request owner server association information and acquired from the storage unit, to a confirmation target terminal management server indicating the management source terminal management server of the terminal identified by the owner identity confirmation start owner server association information;

when receiving the inter-server owner identity confirmation request:

acquiring from the storage unit the identity confirmation information of the owner identified by the owner identity confirmation start owner server association information included in the inter-server owner identity confirmation request, comparing the acquired identity confirmation information with the identity confirmation information included in the inter-server owner identity confirmation request, determining whether or not these indicate the same owner, and transmitting an inter-server owner identity confirmation response including a determination result to the terminal management server of a transmission source of the inter-server owner identity confirmation request; and when receiving the inter-server owner identity confirmation response, transmitting the owner identity confirmation response regarded as the inter-server owner identity confirmation response to the terminal of a transmission source of the owner identity confirmation request.

\* \* \* \* \*